(12) United States Patent
Sakaguchi

(10) Patent No.: US 6,819,799 B1
(45) Date of Patent: Nov. 16, 2004

(54) IMAGE READING APPARATUS, ORIGINAL READING METHOD AND ORIGINAL CONVEYANCE APPARATUS

(75) Inventor: Yasunobu Sakaguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/356,681

(22) Filed: Jul. 19, 1999

(30) Foreign Application Priority Data

Jul. 17, 1998 (JP) .......................................... 10-203745

(51) Int. Cl.$^7$ .............................. G06K 9/36; H04N 1/04

(52) U.S. Cl. ....................... 382/235; 358/474; 358/475; 358/487

(58) Field of Search ................................ 358/474, 475, 358/498, 451, 486, 497, 505, 506, 487; 382/255, 254

(56) References Cited

U.S. PATENT DOCUMENTS

| | | | | |
|---|---|---|---|---|
| 5,208,625 A | * | 5/1993 | Suekane | 354/402 |
| 5,448,332 A | * | 9/1995 | Sakakibara | 355/53 |
| 5,825,043 A | * | 10/1998 | Suwa | 250/548 |
| 6,191,429 B1 | * | 2/2001 | Suwa | 250/548 |

* cited by examiner

Primary Examiner—Jerome Grant, II
(74) Attorney, Agent, or Firm—Sughrue Mion, PLLC

(57) ABSTRACT

Prior to the image reading processing, a focusing point for each optical magnification that can be set for fine scan is stored. At the time of image reading processing, all images of a photographic film are prescanned after setting reading conditions for prescan, and image verification processing is executed after various setup processes. Thereafter, autofocusing processing is executed with a chart in a film carrier as an object, and then the photographic film begins to be conveyed in the reverse direction for fine scan processing. In cases where the optical magnification of an image next to be read is different from the present optical magnification at the time of fine scanning, the position of each portion is set based on the focusing points stored in advance.

24 Claims, 29 Drawing Sheets

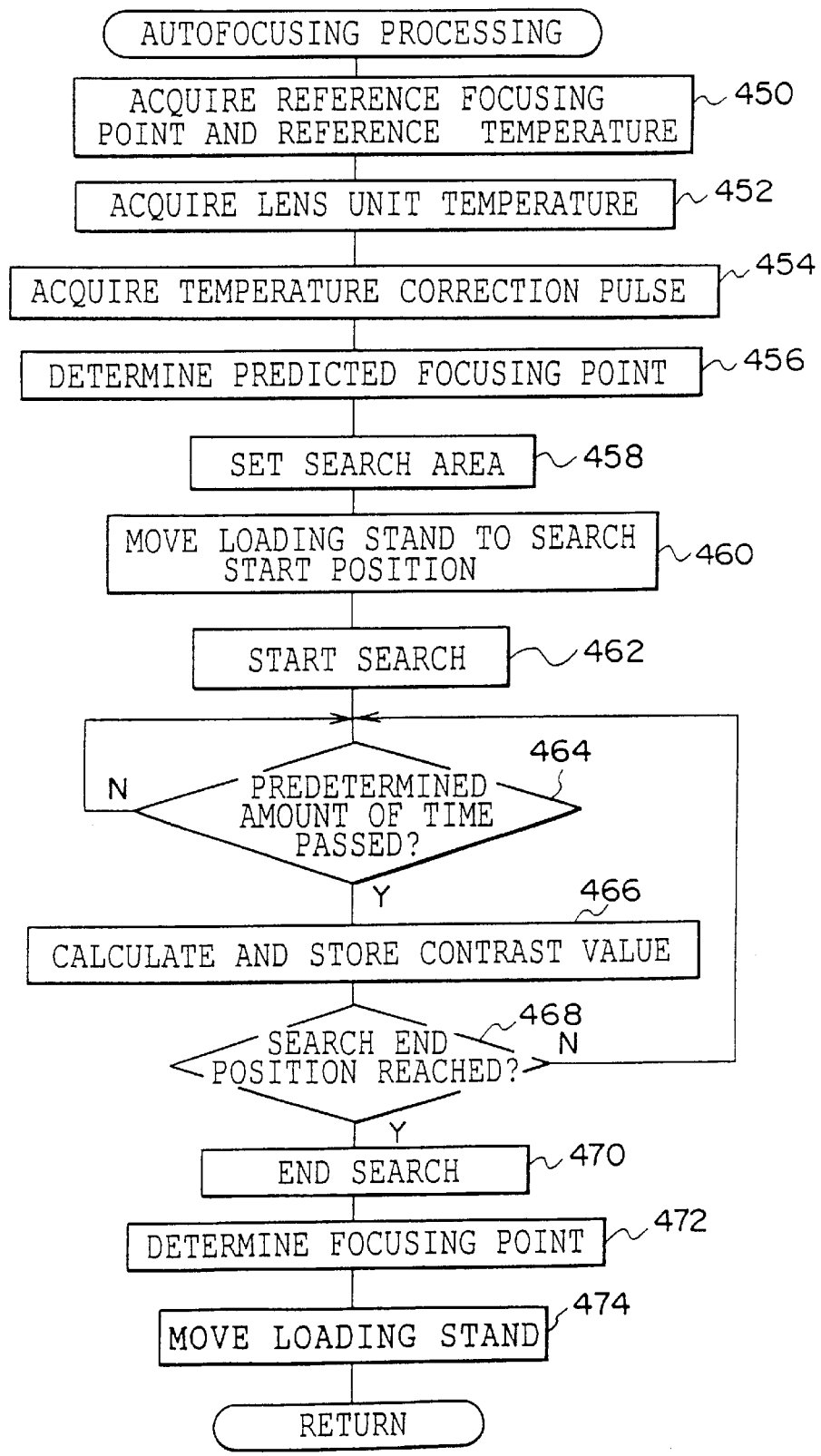

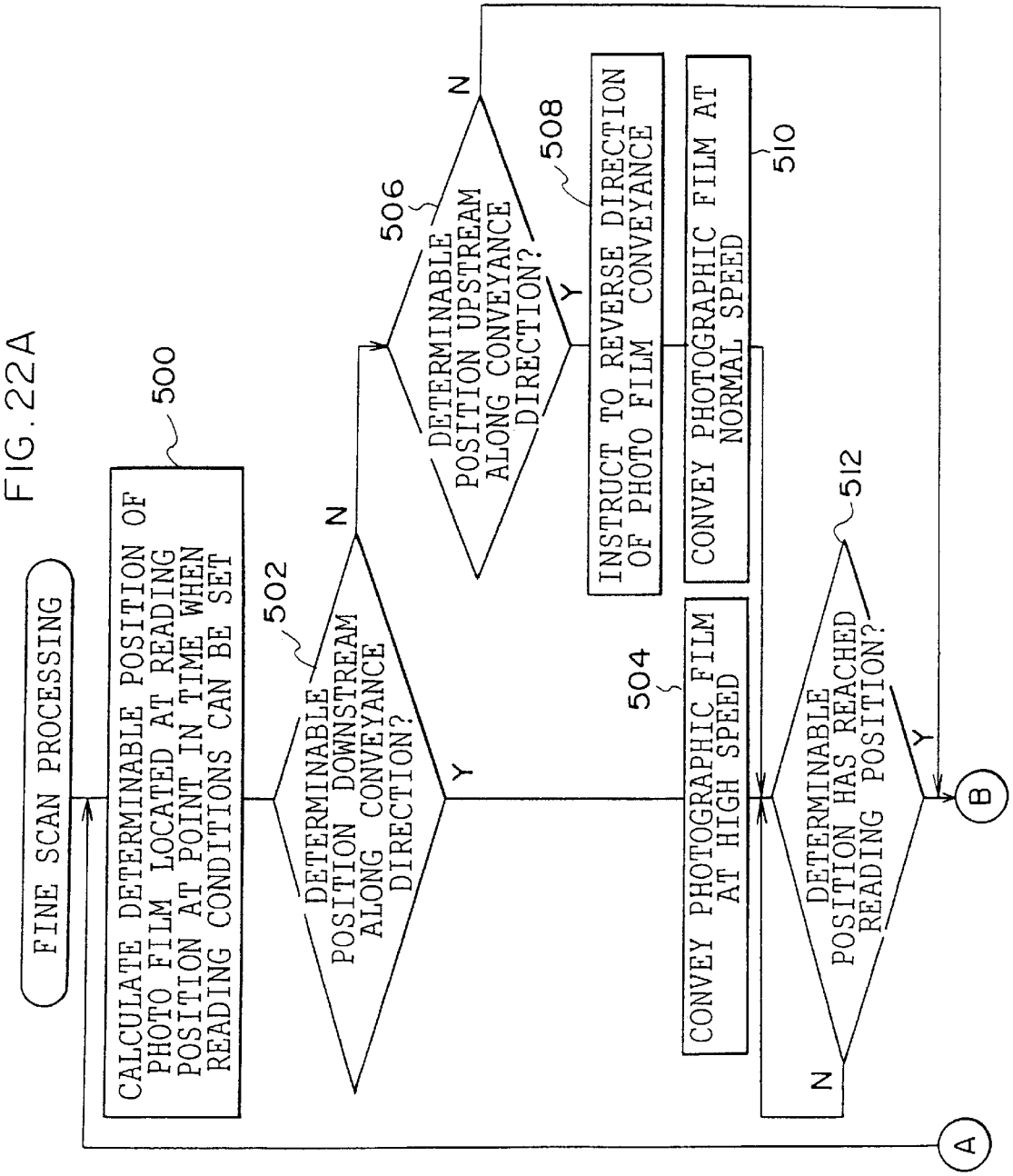

FIG. 25

FOCUSING POINT ADJUSTMENT OF CARRIER

150

FOCUSING POINT ADJUSTMENT OF
CARRIER WILL BE EXECUTED

CARRIER TYPE: *****

POSITION ADJUSTING VALUE:
   CHART POSITION    ####
   FILM POSITION     ####

[EXECUTE]   [CANCEL]

IMAGE READING APPARATUS, ORIGINAL READING METHOD AND ORIGINAL CONVEYANCE APPARATUS

BACKGROUND OF THE INVENTION

1. Field of the Invention

The present invention relates to an image reading apparatus, an original reading method and an original conveyance apparatus, and particularly relates to an image reading apparatus for reading each of a plurality of images recorded on an original to be read such as a photographic film, to an original reading method and to an original conveyance apparatus usable for the image reading apparatus.

2. Description of the Related Art

Conventionally, an image processing system is known, in which film images recorded on a photographic film are read by an image reading apparatus including image forming means and an image sensor such as a CCD, and after variously processing resulting image data by correcting it or otherwise, the image is recorded on a recording medium or displayed on a display unit. The photographic film as referred to herein indicates a film with a negative or positive image made visible by developing processing after photographing a subject.

A conventional image reading apparatus of an image processing system of this type used for reading film images comprises preliminary reading (hereinafter referred to as the prescan) means for reading an image with comparative rapidity with a low definition using a film carrier (original conveyance apparatus) for conveying a photographic film in such a manner that each of a plurality of film images recorded on a photographic film passes sequentially through a predetermined reading position, which preliminary reading is for the purpose of increasing the image reading speed, means for determining reading conditions for main reading (hereinafter referred to as the fine scan) for reading an image at a comparatively low rate with a high definition based on the image data obtained by the prescan and various image processing conditions for the image data obtained by the fine scan, and means for conducting the fine scan on the image data and for processing the image data obtained by the fine scan under the processing conditions thus determined.

On the other hand, photographic films to be read are of several types including size 135 and size 240. In order to enable a single image reading apparatus to read a plurality of these photographic films, a film carrier is prepared for each type of photographic film and changed according to the type of the photographic film.

A conventional image reading apparatus using a plurality of film carriers as described above is available in which film images are located at predetermined reading positions for the respective types of the film carrier and focusing is controlled in such a manner that the image-forming position determined by image-forming means and the image sensor position coincide with each other, and the values for the focusing point obtained by the focusing control are stored for each of a plurality of optical magnifications. When reading a plurality of film images continuously, the value for the focusing position corresponding to the optical magnification of each film image is read from the values of the focusing points for each of a plurality of optical magnifications and at least one of the image-forming means a nd the image sensor are moved.

On the other hand, Japanese Patent Application Laid-open JP-A No. 9-211558 discloses a technique intended for obtaining high-quality image data, comprising an image-forming lens unit having dual functions of magnification adjustment and focusing adjustment (focusing control), in which the focusing is controlled after the magnification adjustment of the image-forming lens unit, after which the magnification of the image-forming lens unit is corrected in accordance with the focusing control. In this way, the focus is controlled accurately, and a projected image of a predetermined size is obtained with an accurate optical magnification, thereby producing a suitable print of high image quality free of vignetting of the lenses.

The technique in which the values of the focusing point are stored for each of a plurality of optical magnifications for each film carrier, however, requires as many focusing control sessions as the optical magnifications for all the film carriers. This gives rise to not only the problem of a considerable time consumed but the problem that a great storage capacity is required due to the requirement that the values of the focusing point obtained from the focusing control are stored for each optical magnification for each film carrier.

The technique disclosed in JP-A No. 211558 described above, on the other hand, poses the problem that for a plurality of images having different optical magnifications to be read continuously with high image quality, the focusing control is required for each image, thereby making high-speed image reading impossible.

SUMMARY OF THE INVENTION

An object of the present invention, which has been developed in order to resolve the problems described above, is to provide an image reading apparatus capable of shortening processing time without need of a large storage capacity and capable of producing high-quality image data, an image reading method and an original conveyance apparatus capable of using the image reading apparatus.

In order to achieve the object described above, according to a first aspect of a first invention, there is provided an image reading apparatus comprising: a light source for illuminating the light on an original to be read having a plurality of images recorded thereon; conveyance means for conveying the original to be read in such a manner that each of the plurality of images passes through a predetermined reading position sequentially; image-forming means for focusing the light transmitted through the original to be read or the light reflected from the original to be read; an image sensor for separating each of the plurality of images recorded on the original to be read into a plurality of pixels, reading the pixels and outputting the pixels as image data; moving means for moving at least one of at least one portion of the image-forming means, the image sensor, and the original to be read along the optical axis direction of the image-forming means; storage means for storing a first value of a focusing point for each of a plurality of optical magnifications and for storing at least one of at least one second value, which is obtained by controlling the moving means in such a manner as to control the focusing for at least one predetermined optical magnification of the plurality of the optical magnifications for an object located at the reading position, and a difference of the second value and the first value at the predetermined optical magnification with respect to the second value, the first value being obtained by controlling the moving means in such a manner as to control the focusing to attain a coincidence between the image-forming position of a reference object which image-forming position depends on the image-forming means and the position of the image sensor for each of the plurality of optical magnifications; and control means for controlling the moving means in such a manner that at least one of at least one portion of the image-forming means, the image sensor and the original to be read moves to a position based on the first value and on one of the difference and the second value, which are stored in the storage means, at the time of reading one of a portion and the whole of the plurality of images.

With the image reading apparatus according to the first aspect, the original to be read having the plurality of images recorded thereon is illuminated with a light source, the original to be read is conveyed by conveyance means in such a manner that each of the plurality of images passes sequentially through the predetermined reading position, the light transmitted through the original to be read or the light reflected from the original to be read is focused by the image-forming means, and each image recorded on the original to be read is separated into a plurality of pixels by the image sensor and output as image data. Further, examples of the original to be read include a transmissible original such as a photographic film and a reflective original such as a photographic print. Also, examples of the image sensor include a line CCD, an area CCD and photoelectric conversion elements other than the CCD.

The image-forming means can use a lens or a group of lenses, but a zoom lens, whose optical magnification can be changed by moving one portion of lenses, may also be used. In cases where the lens or the group of lenses is used, the entirety of the image-forming means is moved, but if the zoom lens is used, only a portion of the image-forming means is moved.

Also, the image reading apparatus according to the first aspect comprises the moving means capable of moving at least one of at least one portion of the image-forming means, the image sensor, and the original to be read along the optical axis direction of the image-forming means, wherein the first value for the focusing point is stored in the storage means for each of the plurality of optical magnifications and at least one of at least one second value and the difference of the second value and the first value for a predetermined one of the plurality of optical magnifications with respect to the second value is stored in storage means, the first value being obtained by controlling the moving means in such a manner that the focusing is controlled to attain coincidence between the image-forming position of the reference object which image-forming position depends on the image-forming means and the position of the image sensor for each of a plurality of optical magnifications, the second value being obtained by controlling the moving means in such a manner that the focusing is controlled for the object at the reading position for at least one predetermined optical magnification of the plurality of optical magnifications. Examples of the object include an image recorded on the original to be read and an object that is a positional reference of the image.

In this way, the difference is added to the first value for each of the optical magnifications stored in the storage means to obtain thereby the value for the focusing point for each of the plurality of the optical magnifications of the object located at the reading position.

In a case where the difference is not stored by the storage means and only the second value is stored, the difference can be obtained by calculating the difference between the second value and the first value for the optical magnification corresponding to the second value.

Further, in the image reading apparatus according to the first aspect, the moving means is controlled by the control means in such a manner that at least one of at least one portion of the image-forming means, the image sensor and the original to be read moves to a position based on the first value, and the second value or the difference which are stored in the storage means when reading a portion or the whole of the plurality of images.

Namely, the position obtained by adding, to the first value for an optical magnification of the image that is the original to be read, the difference stored by the storage means in a case where the difference is stored by the storage means, and the difference between the second value and the first value for the optical magnification corresponding to the second value in a case where only the second value is stored by the storage means, is a position corresponding to the focusing point corresponding to the optical magnification of the image that is the object to be read. By setting at least one of at least one portion of the image-forming means, the image sensor and the image to be read to the resulting position, therefore, the image-forming means and the image sensor can be located at the focusing point of the image to be read without carrying out the focusing control.

As described above, with the image reading apparatus according to the first aspect, the value for the focusing point for each of the plurality of optical magnifications of the object located at the reading position can be obtained based on the first value for each of the plurality of the optical magnifications stored in the storage means and on at least one of the difference for at least one of the plurality of the optical magnifications and the second value. Therefore, the need for carrying out the focusing control for each optical magnification of the object located at the reading position is eliminated, and the storage in the storage means can be completed within a short time. At the same time, the focusing point corresponding to the optical magnification of an image to be read can be set by moving at least one of the image-forming means, the image sensor and the original to be read to a position determined based on the first value and either the difference or the second value. It is therefore possible to set the focusing point within a short time as compared with the case in which the focusing point is controlled for each image to be read, with the result that the overall processing time can be shortened.

According to a second aspect of the invention, in the image reading apparatus according to the first aspect, the control means controls the moving means in such a manner that the focusing is controlled for the object with reference to a position based on the first value and on one of the difference and the second value, which are stored in the storage means, before reading one of a portion and the whole of the plurality of images, a third value for the focusing point at the time when the focusing is controlled for the object is stored, and in the case where the optical magnification of the image next to be read is different from the present optical magnification, the moving means is controlled in such a manner that at least one of at least one portion of the image-forming means, the image sensor, and the original to be read is moved to a position based on the first value and the third value.

In the image reading apparatus according to the second aspect, the control means for the image reading apparatus according to the first aspect controls the moving means in such a manner as to control the focusing of the object according to the reference position based on the first value stored in the storage means and on one of the difference and the second value prior to reading a portion or the whole of the plurality of images, the third value for the focusing point is stored at the same time, and in the case where the optical magnification of the image next to be read is different from the present optical magnification, at least one of at least one portion of the image-forming means, the image sensor and the original to be read is moved to the position based on the first value and the third value.

As described above, with the image reading apparatus according to the second aspect, the focusing of the object is controlled prior to reading the image, the third value for the resulting focusing point is stored, and in the case where the optical magnification of the image next to be read is different from the present optical magnification, at least one of at least one portion of the image-forming means, the image sensor and the original to be read is moved to a position based on the first value and the third value. Therefore, the optimum focusing point corresponding to the actual reading environment can be set, and the focusing point can be set with higher accuracy than when the focusing point is set without using the third value.

According to a third aspect of the invention, in the image reading apparatus according to the second aspect, the object is provided in the vicinity of a conveyance passage surface of the original to be read in the conveyance means, the apparatus further comprises a limiting member disposed on or in the vicinity of the conveyance means, for limiting the range of displacement of the original to be read along the optical axis direction to twice the depth of field of the image-forming means or less, and the apparatus offsets the distance equal to one half of the range of displacement with respect to a position determined according to the first value and the third value.

With the image reading apparatus according to the third aspect, the object in the image reading apparatus according to the second aspect is disposed in the vicinity of the conveyance passage of the original to be read in the conveyance means, the range of displacement of the original to be read along the optical axis direction is limited to not more than twice the depth of field of the image-forming means by the limiting member disposed on or in the vicinity of the conveyance means, and the distance equal to one half of the range of displacement is offset with respect to a position determined in accordance with the first value and the third value.

As described above, with the image reading apparatus according to the third aspect, the object for the image reading apparatus according to the second aspect is disposed in the vicinity of the conveyance passage of the original to be read in the conveyance means, and the range of displacement of the original to be read along the optical axis direction is limited to not more than twice the depth of field of the image-forming means by a limiting member disposed on or in the vicinity of the conveyance means, while at the same time offsetting the distance equal to one half the range of displacement with respect to a position determined by the first value and the third value. Even in the case where the position of the original to be read along the optical axis direction is displaced to a maximum degree, the deviation of the focusing point from the correct focusing point for the image recorded in the original to be read is limited within a range accommodated in the depth of field of the image-forming means, with the result that an image of high quality can be produced reliably.

With an image reading apparatus according to a fourth aspect of the invention, in the image reading apparatus according to the second aspect, the storage means further records as a fourth value a difference in position with respect to the optical axis direction between the original to be read and the object; and the controlling means, in a case where the optical magnification of the image next to be read is different from the present optical magnification, controls the moving means so as to move at least one of at least one portion of the image-forming means, the image sensor, and the original to be read, to a position based on the first value, the third value, and the fourth value.

With the image reading apparatus according to the fourth aspect, the difference in position with respect to the optical axis direction between the original to be read and the object is stored as the fourth value by the storage means in the image reading apparatus according to the second aspect. Namely, the first value, at least one of the difference and the second value, and the fourth value are stored by the storage means.

Further, with the image reading apparatus according to the fourth aspect, the controlling means according to the second aspect, in a case where the optical magnification of the image next to be read is different from the present optical magnification, controls the moving means so as to move at least one of at least one portion of the image-forming means, the image sensor, and the original to be read to a position based on the first value, the third value, and the fourth value.

In this way, with the image reading apparatus according to the fourth aspect, the storage means according to the second aspect further stores the difference in position with respect to the optical axis direction between the original to be read and the object, and the controlling means effects control such that at least one of at least one portion of the image-forming means, the image sensor, and the original to be read is moved to a position based on the first value, the third value, and the fourth value. As a result, in comparison with a case in which the fourth value is not applied, a more accurate focusing point can be set.

In an image reading apparatus according to a fifth aspect, in the image reading apparatus according to either the first aspect or the fourth aspect, when processing using the first value is carried out, the first value is used after being corrected in accordance with a difference between the present temperature and a temperature when the first value is obtained.

With the image reading apparatus according to the fifth aspect, in the image reading apparatus according to either the first aspect or the fourth aspect, when processing using the first value is carried out, the first value is used after being corrected in accordance with the difference between the present temperature and a temperature when the first value is obtained.

The focusing point is changed in accordance with temperature at a gradient corresponding to the optical magnification. As a result, there is variation in the first value in cases in which there is a temperature difference between the time the first value is obtained and the time when processing using the first value is carried out. Accordingly, in the present fifth aspect, correction based on the temperature difference is carried out in order to correct the difference in the first value caused by the temperature difference.

In this way, in the image reading apparatus according to the fifth aspect, in either the first aspect or the fourth aspect, when processing using the first value is carried out, the first value is used after being corrected based on the temperature difference between that time and the time the first value was obtained. Thus, in comparison to a case in which this correction is not carried out, a more accurate focusing point can be set.

According to a sixth aspect of the invention, in the image reading apparatus according to the first aspect, a plurality of the conveyance means corresponding to the types of the original to be read is comprised; wherein the storage means stores at least one of the difference and the second value for each of a plurality of the conveyance means.

As described above, with the image reading apparatus according to the sixth aspect, the conveyance means according to the first aspect is provided for each type of the original to be read, at least one of the difference and the second value for each conveyance means is stored in the storage means, the focusing is controlled only once for each conveyance means, and there is as a minimum only one value(at least one of the difference and the second value) stored for each conveyance means. As compared with the case where the focusing is controlled for each optical magnification for each conveyance means to store thereby the value for each focusing point, therefore, less time is consumed for the focusing control and the storage capacity for storing the value for the focusing point can be reduced.

According to a seventh aspect of the invention, in the image reading apparatus according to either the second or the third aspect, a plurality of the conveyance means corresponding to the types of the original to be read is comprised; wherein the storage means stores at least one of the difference and the second value for each of a plurality of the conveyance means, and the control means stores the third value for the conveyance means used.

As described above, with the image reading apparatus according to the seventh aspect, the conveyance means according to either the second or third aspect is provided for each type of the original to be read, the storage means stores at least one of the difference and the second values for each conveyance means, the control means stores the third value for the conveyance means to be used, the focusing is controlled only once for each conveyance means, and there is as a minimum only one value (at least one of the difference and the second value) to be stored for each conveyance means. Thus, as compared with the case in which the focusing is controlled for each optical magnification for each conveyance means and the value for each focusing point is stored, the time consumed for the focusing control can be shortened and the storage capacity for storing the value for the focusing point can be reduced.

In an image reading apparatus according to an eighth aspect, in the image reading apparatus according to either the first aspect or the seventh aspect, the object is used as the reference object.

In this way, with the image reading apparatus of the eighth aspect, the object is used as the reference object in either the first aspect or the seventh aspect. Thus, in comparison with a case in which the reference object and the object are prepared separately, the cost of preparing the reference object can be reduced.

By the way, the image reading method according to the present invention exhibits a function and an effect similar to those of the first invention.

According to a first aspect of a second invention, there is provided an original conveyance apparatus for conveying an image recorded on an original to be read mounted in an image reading apparatus to a predetermined reading position, comprising an object that can be read by the image reading apparatus and is a reference for controlling the focusing of the image at a position other than a conveyance passage for the original to be read.

As described above, the original conveyance apparatus according to the first aspect of the second invention comprises the object that is a reference for controlling the focusing of an image that can be read by the image reading apparatus and recorded on the original to be read at a position other than the conveyance passage for the original to be read. Therefore, the effect of warping or the like of the original to be read at the time of controlling the focusing of the image directly can be removed. Thus image data of high quality can be produced while at the same time making it possible to control the focusing while reading the image recorded on the original to be read.

Also, with the original conveyance apparatus according to the second aspect of the second invention, in the original conveyance apparatus according to the first aspect, one each of the object is disposed on both sides of the conveyance passage of the original to be read.

As described above, with the original conveyance apparatus according to the second aspect, an effect similar to that of the first aspect is exhibited, and one each of the object is disposed on both sides of the conveyance passage of the original to be read according to the first aspect. By setting the central portion of each focusing point of each object as the focusing point of the original to be read, therefore, the focusing point of a main object generally located substantially at the center of the original to be read can be determined reliably even in the case where the original conveyance apparatus is loaded in the image reading apparatus in a state of being tilted in the direction perpendicular to the direction of conveyance of the original to be read.

BRIEF DESCRIPTION OF THE DRAWINGS

FIGS. 4A to 4D are plan views, in which FIG. 4A shows an example of a restrictor, FIG. 4B an example of a turret, FIG. 4C an example of a lens iris, and FIG. 4D an example of a CCD shutter.

FIG. 17 is a flowchart for autofocusing processing executed during the image reading processing of FIG. 13.

FIGS. 22A and 22B are flowcharts of fine scanning processing executed during the image reading processing of FIG. 13.

FIGS. 23A and 23B are schematic diagrams showing the relative positions of the line CCD scanner and the photographic film at the time of the image reading processing, in which FIG. 23A is a diagram showing the state in which a single image is to be processed and FIG. 23B is a diagram showing the state in which the images to be processed are adjacent to each other and the conditions for the image later to be read cannot be set normally in time.

FIG. 25 is a schematic view showing an image screen to be displayed on a display during the image reading processing of FIG. 13.

DESCRIPTION OF THE PREFERRED EMBODIMENTS

First embodiment of the present invention will be described in detail below with reference to the accompanying drawings.

Figure 1:
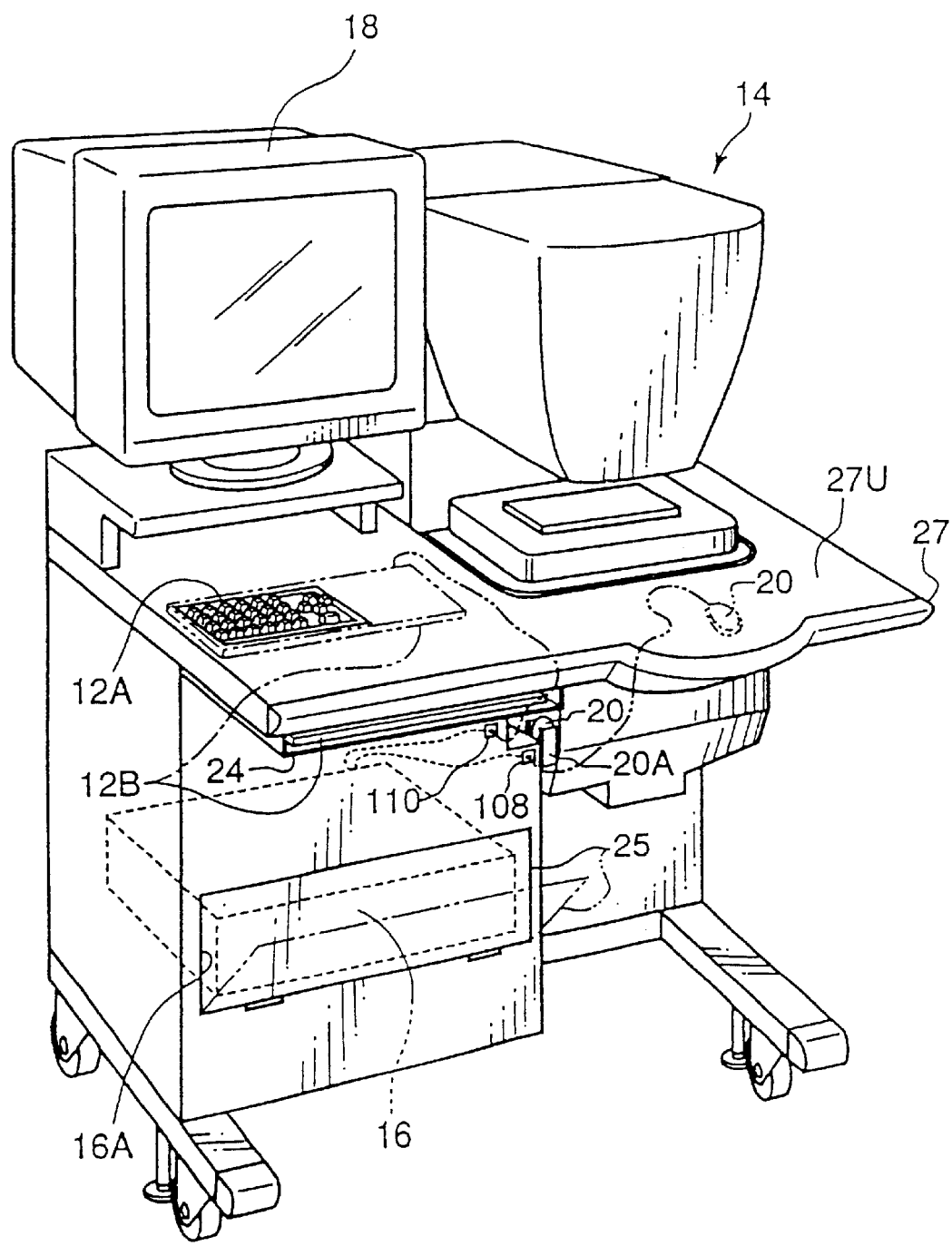
FIG. 1 is a diagram showing the appearance of an image reading apparatus according to an embodiment of the present invention.

As shown in FIG. 1, an image reading apparatus according to an embodiment comprises a line CCD scanner 14, which is arranged on a work table 27 including an image processing section 16, a mouse 20, two types of keyboards 12A, 12B and a display 18.

The keyboard 12A is embedded in a work surface 27U of the work table 27. The other keyboard 12B is stored in a drawer 24 of the work table 27 when not in use, and taken out of the drawer 24 and laid on the keyboard 12A when in use. At this time, the cord of the keyboard 12B is connected to a jack 110 which in turn is connected to the image processing section 16.

The cord of the mouse 20 is connected to the image processing section 16 through a hole 108 formed in the work table 27. The mouse 20 is stored in a mouse holder 20 A when not in use, and taken out of the mouse holder 20 and placed on the work surface 27U when in use.

The image processing section 16 is accommodated in an accommodation portion 16A arranged in the work table 27 and closed therein by a door 25. The image processing section 16 can be taken out when the door 25 is opened.

The line CCD scanner 14 is for reading a film image recorded in a photographic film such as a negative film or a reversal film (positive film), and can read the film images from 135-size photographic film, 110-size photographic film, photographic film formed with a transparent magnetic layer (240-size photographic film or what is called APS film) and 120-size and 220-size photographic films (brownie size). The line CCD scanner 14 reads the film image to be read by a line CCD and outputs image data.

The image processing section 16, upon inputting thereto of the image data output from the line CCD scanner 14, objects the image data to various processing such as correction, and outputs the resulting recording image data to a laser printer section (not shown).

Figure 2:
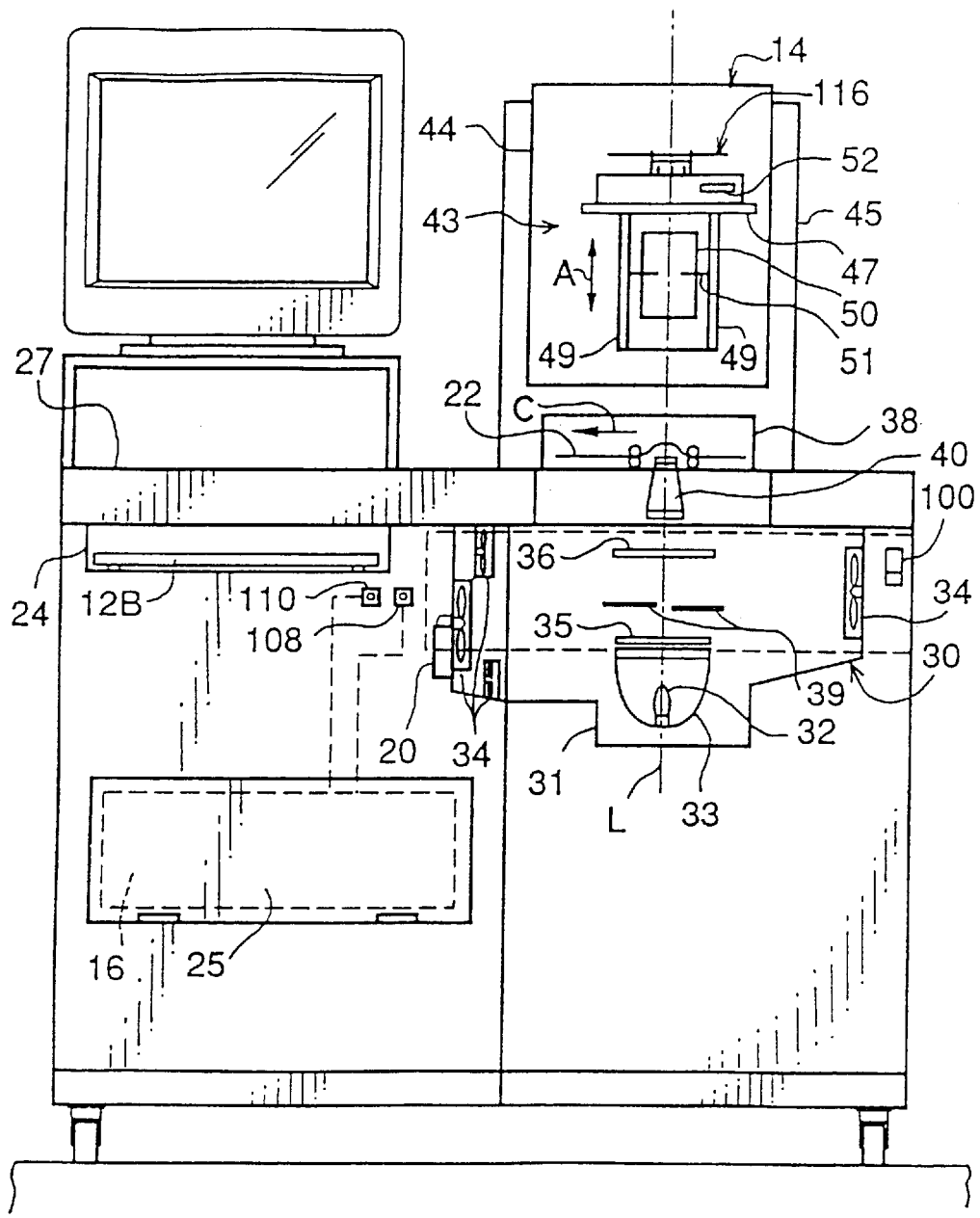
FIG. 2 is a front sectional view of an optical system of an image reading apparatus according to the embodiment of the present invention.
Figure 3:
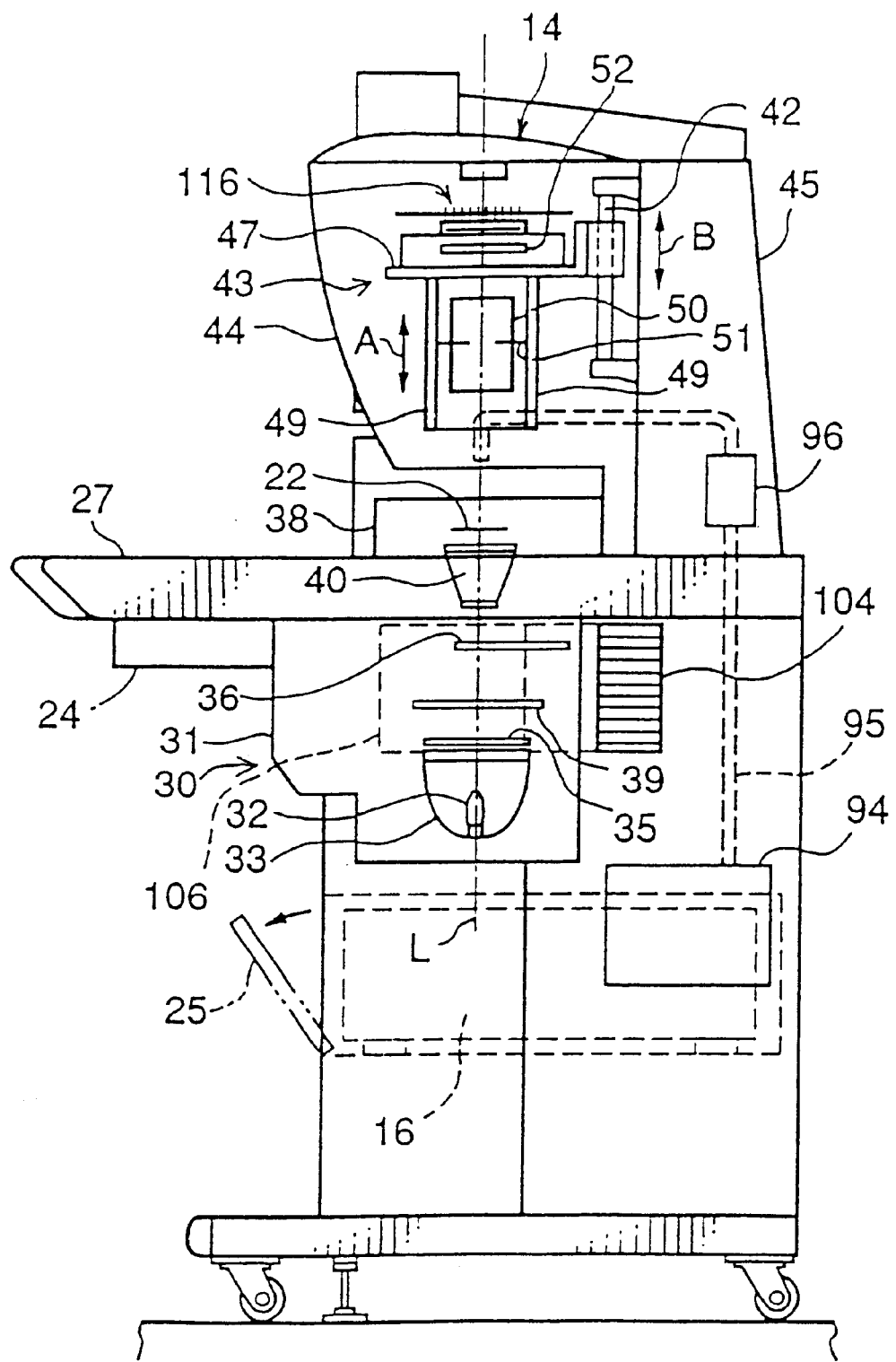
FIG. 3 is a side sectional view of an optical system of an image reading apparatus according to the embodiment of the present invention.

As shown in FIGS. 2 and 3, the optical system of the line CCD scanner 14 includes a light source section 30 disposed under the work table 27, a diffusion box 40 supported on the work table 27, a film carrier 38 set in the work table 27 and a reading section 43 disposed at the side of the work table 27 opposite the side nearer to the light source section 30.

The light source section 30 is housed in a metal casing 31, in which a lamp 32 such as a halogen lamp or a metal halide lamp is disposed. The lamp 32 is held at an X-Y stage (not shown) movable in two directions, i.e. longitudinally (along the direction of conveyance) and transversely of the photographic film 22. The position of the lamp 32 can be finely adjusted by moving the position of the X-Y stage.

A reflector 33 is provided at the periphery of the lamp 32 for reflecting part of the light emitted from the lamp 32 so as to reflect it in a predetermined direction. A plurality of fans 34 are arranged at the sides of the reflector 33. The fans 34 are operated while the lamp 32 is on to prevent thereby the interior of the casing 31 from overheating.

On the side of the reflector 33 from which the light is emitted, there are arranged a UV/IR cutting filter 35 for cutting the light of a wavelength in an ultraviolet range and infrared range to prevent thereby temperature increases as well as chemical changes of the photographic film to assure improved reading accuracy, a diaphragm 39 for adjusting the amounts of the light emitted from the lamp 32 and reflected by the reflector 33, and a turret 36 (see also FIG. 4B) having fitted therein a balance filter 36N for the negative film and a balance filter 36P for the reversal film whereby the color components of the light that reaches at the photographic film 22 and the reading section 43 are set appropriately in accordance with the type of the photographic film (negative film or reversal film).

Figure 4A:
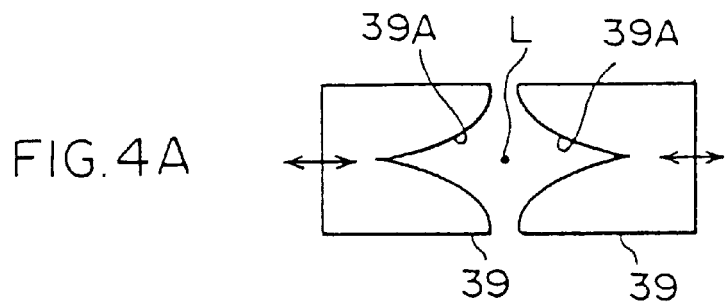

The diaphragm 39 is formed from a pair of plate members arranged with the optical axis L therebetween. The two plate members are slidable away from or toward each other. As shown in FIG. 4A, the two plate members of the diaphragm 39 each have a notch formed at one end thereof so that the sectional area along the direction perpendicular to the sliding direction continuously changes from one end toward the other along the sliding direction, and are arranged with the sides thereof having notches facing each other.

In the structure described above, one of the filters 36N, 36P is positioned on the optical axis L according to the type of the photographic film in such a manner as to secure the light of the desired light components, and the amount of the light passing through the diaphragm 39 is adjusted to a desired amount, according to the position of the diaphragm 39.

The diffusion box 40 is so shaped that the length of the photographic film along the direction in which it is conveyed by the film carrier 38 decreases (FIG. 2) while the length of the photographic film along the direction perpendicular to the conveyance direction (transverse direction of the photographic film) increases (FIG. 3) progressively toward the upper end thereof, i.e. in a direction toward the photographic film 22. Also, a light diffusion plate (not shown) is mounted on each of the light-entering side and the light-exiting side of the diffusion box 40. In addition to the diffusion box 40 described above for the 135-size photographic film, spread boxes (not shown) of shapes corresponding to other photographic films are also readied.

The light that has entered the diffusion box 40 is directed toward the film carrier 38 (i.e., the photographic film 22), and is converted into a slit light having a longitudinal side thereof along the width of the photographic film 22. Also, this slit light exits from the diffusion box 40 as diffused light due to the light diffusing plates. By the light exiting from the diffusion box 40 being converted into diffused light in this way, the unevenness of the light illuminated onto the photographic film 22 is reduced, so that a slit light of a uniform amount of light is illuminated onto the film image, and even if the film image is scratched, the scratches are difficult to notice.

The film carrier 38 and the diffusion box 40 are prepared for each type of the photographic film 22 to be read and are selected in accordance with the photographic film 22.

An elongate aperture (not shown) longer than the width of the photographic film 22 is arranged transversely of the photographic film 22 at each of positions on the upper surface and the lower surface of the film carrier 38 corresponding to the optical axis L. The slit light from the diffusion box 40 is illuminated onto the photographic film 22 through the aperture formed in the lower surface of the film carrier 38, while the light transmitted through the photographic film 22 arrives at the reading section 43 through the aperture formed in the upper surface of the film carrier 38.

Figure 5A:
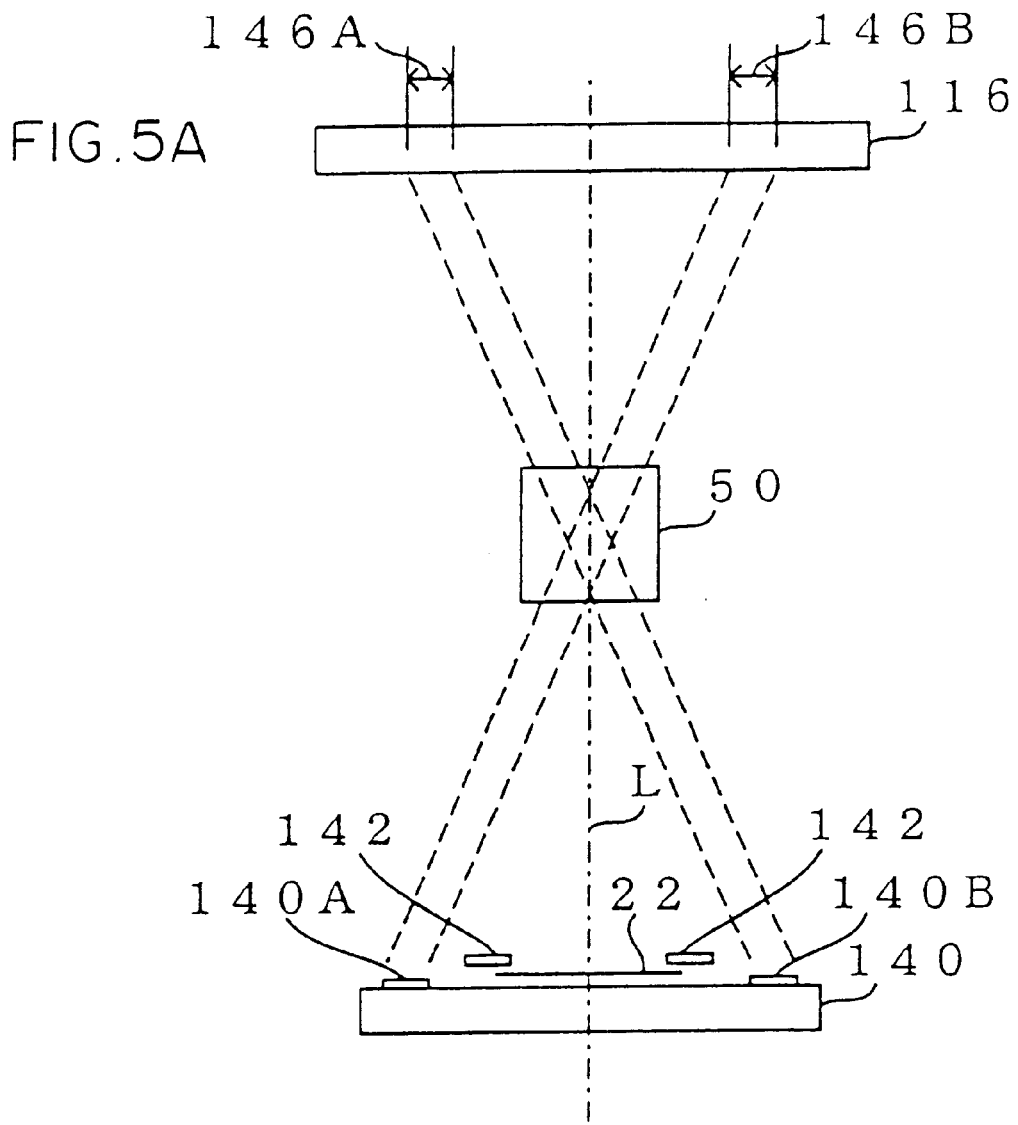
FIGS. 5A and 5B are diagrams showing a state in which a glass member is mounted on a film carrier and a state of a chart provided in the glass member, FIG. 5A being a side view, and FIG. 5B being a plan view.
Figure 5B:
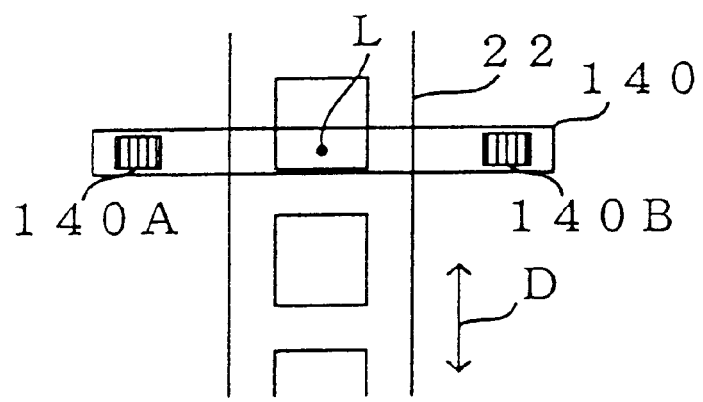

At a position of the conveyance passage (not shown) for the photographic film 22 of the film carrier 38 on the optical axis L and on the lower side of the photographic film 22, as shown in the side view of FIG. 5A and the plan view of FIG. 5B, a glass member 140 is disposed with charts 140A and 140B, respectively provided in the vicinity of the longitudinal ends thereof, which charts plot plurality of straight lines along the direction D in which the photographic film 22 is conveyed. The glass member 140 is disposed with the longitudinal direction thereof running in the longitudinal direction of the line CCD 116 (see FIGS. 2 and 3 also). In this case, the glass member 140 is disposed on the film carrier 38 in such a manner that the centers of the charts 14A, 14B coincide substantially with the optical axis L, i.e. in such a manner that the distance from the optical axis L to each chart is substantially equal. The charts 140A, 140B and the glass member 140 are made of a material high in transmittance.

Also, a guide 142 (see FIG. 5A, not shown in FIG. 5B) for preventing fluttering of the photographic film 22 along the optical axis L during conveyance thereof is arranged above the vicinity of each transverse end of the photographic film 22, i.e., above the conveyance passage for the photographic film 22 of the film carrier 38. The charts 140A, 140B are each located outside of the guides 142 and the photographic film 22 in the transverse direction.

Also, the length of the slit light exiting from the diffusion box 40 is slightly longer than the length of the glass member 140 at the position where the glass member 140 is disposed. As a result, the light exiting from the diffusion box 40 is transmitted through an area including the charts 140A, 140B, is the transmitted light is focused on the line CCD 116 by the lens unit 50 (see also FIGS. 2 and 3). In the process, the light transmitted through the charts 140A, 140B is focused on predetermined chart areas 146A, 146B, which are respectively in the vicinity of the ends of the line CCD 116, and is used as an object for focusing control.

Although the structure of FIG. 5A, 5B includes a film carrier for a long 135-size or 240-size photographic film, a film carrier (not shown) is also prepared for conveying a photographic film held in a frame member (mount), i.e. what is called a slide, to the reading position. This film carrier for the slide is not provided with the charts 140A, 140B, so that when the film carrier for the slide is used, the focusing control is effected using the film image recorded on the photographic film as an object directly.

The film carrier 38 for a long photographic film has two focusing charts for the reason described below.

Specifically, depending on the manner in which the film carrier 38 is loaded on the line CCD scanner 14 or the manner in which the glass member 140 is mounted on the film carrier 38, the glass member 140 may be tilted with respect to the transverse direction of the photographic film 22. In such a case, if the focusing chart is provided only at one point outside a transverse direction end of the photographic film 22, the focusing position obtained by the chart would be considerably deviated from the transverse direction center of the photographic film 22. Normally, the main object of a film image, such as an image of a person recorded on the photographic film, is often located at a central portion of the film image. The focusing position obtained in this way, therefore, is considerably deviated from the focusing position of the main object.

Figure 6:
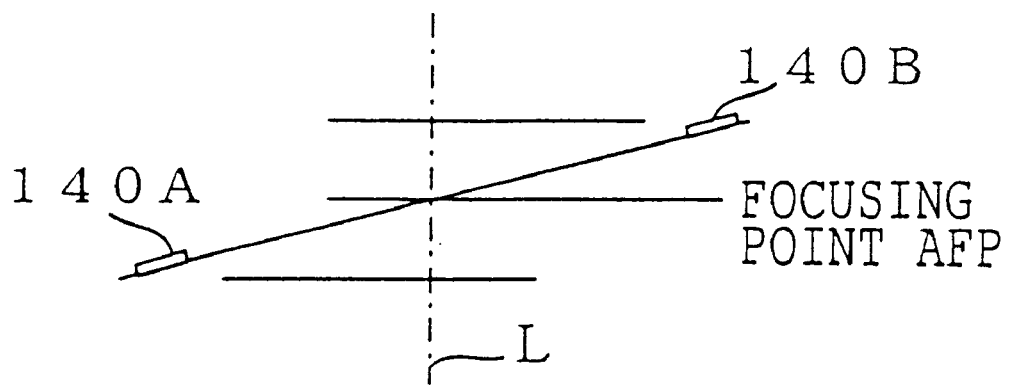
FIG. 6 is a side view schematically showing relative positions of each chart as well as the final focusing point.

In view of this, according to the present embodiment, as shown in FIG. 6, the charts 140A, 140B are respectively provided at two points, on both sides of the transverse direction center (optical axis L) of the photographic film 22, and a position AFP obtained as the arithmetic mean of the focusing positions of the charts is used as a focusing position.

As shown in FIGS. 2 and 3, the diffusion box 40 is supported with the upper surface thereof in proximity to the reading position. As a result, a notch is formed in the lower surface of the film carrier 38 so that the film carrier 38 and the diffusion box 40 do not interfere with each other at the time of loading the film carrier 38.

The film carrier is structured in such a manner that the photographic film 22 can be conveyed at a plurality of speeds corresponding to the density and the like of the film image to be fine scanned.

The reading section 43 is disposed so as to be accomodated inside the casing 44. A loading stand 47 with the line CCD 116 mounted on the upper surface thereof is disposed in the casing 44, and a lens cylinder 49 hangs downward from the loading stand 47. A lens unit 50 is supported in the lens cylinder 49 so as to be slidable in the directions of A toward or away from the work table 27 in order to reduce, enlarge or otherwise change the magnification. A support frame 45 is erected on the work table 27. The loading stand 47 is supported on a guide rail 42 mounted on the support frame 45 so as to be slidable along the directions of arrow B toward or away from the work table 27 for ensuring the conjugate length at the time of magnification or focusing control.

The lens unit 50 includes a plurality of lenses between which a lens diaphragm 51 is inserted. As shown in FIG. 4C, the lens diaphragm 51 includes a plurality of substantially C-shaped iris plates 51A. The iris plates 51A are arranged uniformly around the optical axis L with an end of each thereof supported on a pin so as to be rotatable about the pin. A plurality of the iris plates 51A are linked to each other through a link (not shown), so that upon transmission thereto of driving force of a lens diaphragm driving motor (described later), the iris plates are rotated in the same direction. With the rotation of the iris plates 51A, the area of the portion not shielded by the iris plates 51A around the optical axis L (the substantially star-shaped portion in FIG. 4C) is changed to change thereby the amount of the light passing through the lens diaphragm 51.

The line CCD 116 includes a multiplicity of photoelectric conversion elements such as CCD cells or photodiodes arranged in alignment transversely of the photographic film 22, and sensing units having an electronic shutter mechanism are arranged in three parallel lines in spaced relation to each other. One of color separation filters of R, G, and B is mounted on the light incident side of each sensing unit to constitute thereby what is called three-line color CCD. Also, a multiplicity of transfer units are provided in the vicinity of the sensing units corresponding thereto, respectively. The charge stored in each CCD cell of each sensing unit is transferred sequentially through a corresponding one of the transfer units.

Also, a CCD shutter 52 is arranged on the light incidence side of the line CCD 116. As shown in FIG. 4D, the CCD shutter 52 has an ND filter 52 ND fitted therein. The CCD shutter 52 rotates in the direction of arrow u and thus switches to a completely closed state for blocking light that would otherwise be incident on the line CCD 116 for darkness correction or protecting the color separation filter arranged in the line CCD 116 (the portion 52B or the like where the ND filter 52ND is not fitted is located at a position 52C including the optical axis L), a completely open state allowing the light to be incident on the line CCD 116 for normal reading or brightness correction (position of FIG. 4D) or a reduced light state in which the light incident on the line CCD 116 is reduced by the ND filter 52ND for linearity correction (the ND filter 52ND is located at position 52C).

As shown in FIG. 3, the work table 27 has arranged thereon a compressor 94 for generating cooling air for cooling the photographic film 22. The cooling air generated by the compressor 94 is guided and supplied to the reading section (not shown) of the film carrier 38 by a guide pipe 95. As a result, the area of the photographic film 22 located at the reader unit can be cooled. By the way, the guide pipe 95 is passed through a flow rate sensor 96 for detecting the flow rate of the cooling air.

Figure 7:
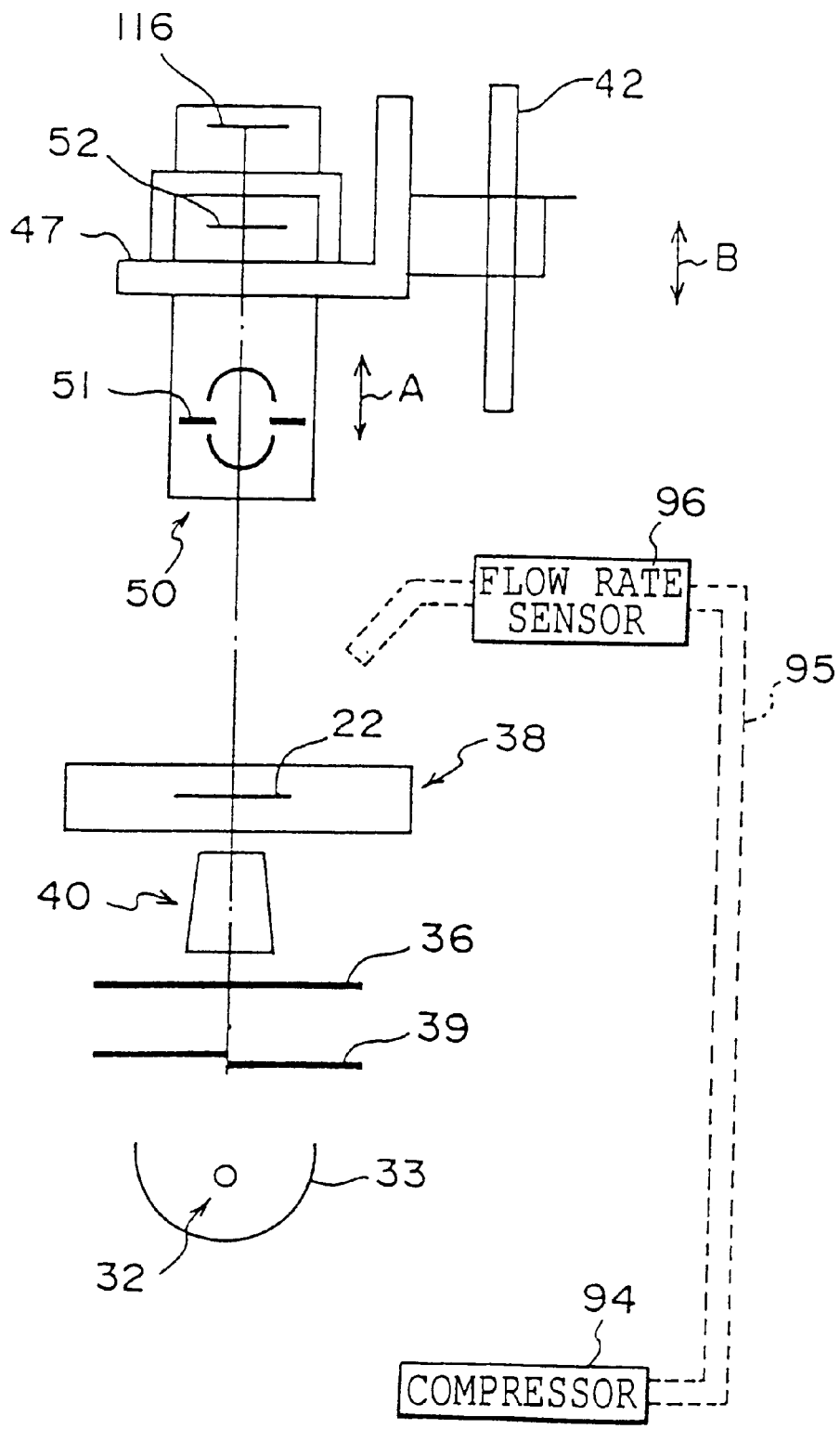
FIG. 7 is a schematic diagram showing only main portions of the optical system of an image reading apparatus according to the embodiment of the present invention.
Figure 8:
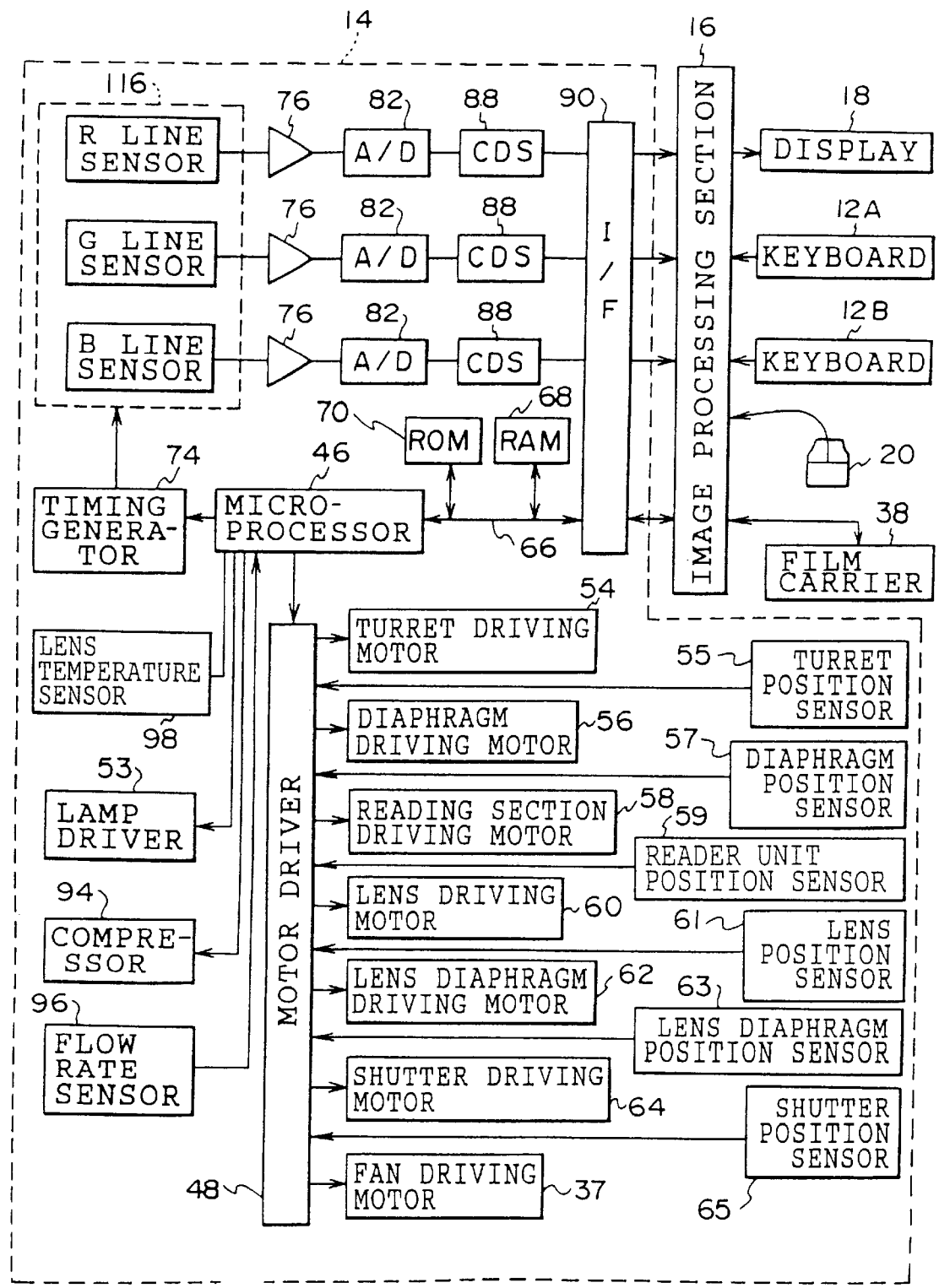
FIG. 8 is a block diagram showing a general configuration of an electrical system of a line CCD scanner and an image processing section of an image reading apparatus according to the embodiment of the present invention.

Now, a general configuration of the electrical system of the line CCD scanner 14 and the image processing section 16 shown in FIG. 8 will be explained with reference to essential portions of the optical system of the line CCD scanner 14 shown in FIG. 7.

The line CCD scanner 14 includes a microprocessor 46 which governs overall control of the line CCD scanner 14. The microprocessor 46 is connected by a bus 66 to a RAM 68 (such as a SRAM), and a ROM 70 (such as a ROM with stored contents thereof being rewritable), and is connected to a lens temperature sensor 98, a lamp driver 53, the compressor 94, the flow rate sensor 96 and a motor driver 48.

The lens temperature sensor 98 constantly detects the internal temperature of the lens unit 50, so that the microprocessor 46 can be always informed of the internal temperature of the lens unit 50. The lamp driver 53, on the other hand, turns on and off the lamp 32 in compliance with instructions from the microprocessor 46. Also, in order to supply the cooling air to the photographic film 22 when reading the film image from the photographic film 22, the microprocessor 46 activates the compressor 94. The flow rate of the cooling air is detected by the flow rate sensor 96 so that the microprocessor 46 senses abnormalities.

Figure 4B:
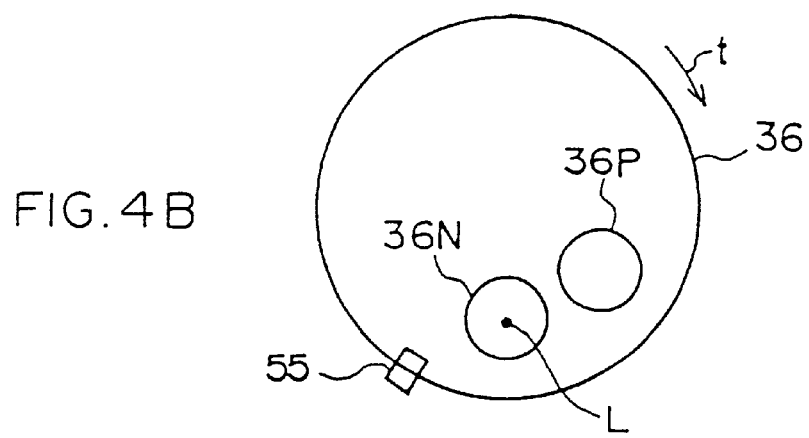
Figure 4C:
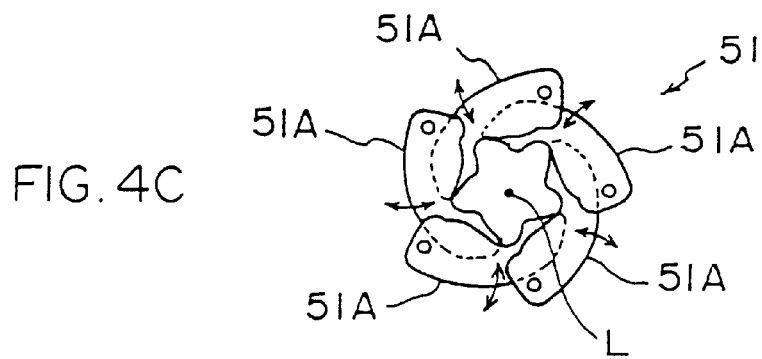
Figure 4D:
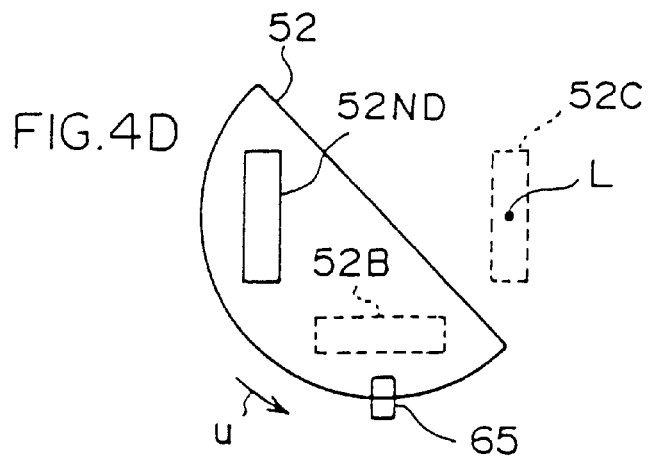

The motor driver 48 is connected to a turret driving motor 54 and a turret position sensor 55 for detecting a reference position (a notch not shown) of the turret 36 (see FIG. 4B also) The turret driving motor 54 is for rotationally driving the turret 36 in the direction of arrow t in FIG. 4B in order to locate the negative film balance filter 36N or the reversal film balance filter 36P of the turret 36 on the optical axis L.

The motor driver 48 is further connected with a diaphragm driving motor 56 for sliding the diaphragm 39, a diaphragm position sensor 57 for detecting the position of the diaphragm 39, a reading section driving motor 58 for sliding the loading stand 47 (i.e. the line CCD 116 and the lens unit 50) along the guide rail 42, a reader unit position sensor 59 for detecting the position of the loading stand 47, a lens driving motor 60 for sliding the lens unit 50 along the lens cylinder 49, a lens position sensor 61 for detecting the position of the lens unit 50, a lens diaphragm driving motor 62 for rotating the iris plates 51A of the lens diaphragm 51, a lens diaphragm position sensor 63 for detecting the position of the lens diaphragm 51 (the position of the iris plates 51A), a shutter drive motor 64 for switching the CCD shutter 52 to the completely closed state, the full-open state or the reduced light state, a shutter position sensor 65 for detecting the shutter position and a fan drive motor 37 for driving the fans 34.

The microprocessor 46 causes the turret driving motor 54 to rotationally drive the turret 36 and causes the diaphragm driving motor 56 to slide the diaphragm 39 to adjust the light illuminated onto the film image based on the positions of the turret 36 and the diaphragm 39 detected by the turret position sensor 55 and the diaphragm position sensor 57, respectively, at the time of the prescan (preliminary read operation) and the fine scan (main read operation) by the line CCD 116.

Also, the microprocessor 46 determines the optical magnification in accordance with the size of the film image or in accordance with whether the film image is to be trimmed or not, causes the reading section driving motor 58 to slide the loading stand 47 based on the position of the loading stand 47 detected by the reader unit position sensor 59 in such a manner that the film image may be read by the line CCD 116 at the optical magnification determined as above, and causes the lens driving motor 60 to slide the lens unit 50 based on the position of the lens unit 50 detected by the lens position sensor 61.

In the focusing control for rendering the light-receiving surface of the line CCD 116 coincide with the position at which the film image is focused by the lens unit 50, the microprocessor 46 causes the reading section driving motor 58 to slide only the loading stand 47.

Namely, the image-forming relation in the line CCD scanner 14 according to the present embodiment is determined by relative positions along the optical axis L of the line CCD 116, the lens unit 50 and the photographic film 22. According to the present embodiment, the optical magnification is determined, as described above, by causing the reading section driving motor 58 to slide the loading stand 47 and also the lens driving motor 60 to slide the lens unit 50. In order to maintain the image-forming relation with the optical magnification set in this way, the distance between the line CCD 116 and the lens unit 50 is fixed while changing the distance between the lens unit 50 and the photographic film 22 to perform the focusing control.

By controlling the focusing in this manner, the variations in the optical magnification for each film image can be suppressed when reading a plurality of film images recorded on the photographic film 22.

According to the present embodiment, this focusing control is carried out by the TTL (Through The Lens) method in a manner to maximize the contrast of the image read by the line CCD 116. Also, according to the present embodiment, prior to the focusing control, focus calibration processing is effected and will be described in detail later.

On the other hand, the line CCD 116 is connected with a timing generator 74. The timing generator 74 generates various timing signals (clock signals) for operating the line CCD 116, an A/D converter 82 to be described later, and the like.

The signal output terminal of the line CCD 116 is connected to the A/D converter 82 through an amplifier 76. The signal outputted from the line CCD 116 is amplified by the amplifier 76 and converted into digital data by the A/D converter 82.

The output terminal of the A/D converter 82 is connected to the image processing section 16 through a correlation double sampling circuit (CDS) 88 and an interface (I/F) circuit 90 in that order. The CDS 88 samples each of feedthrough data representing the level of the feedthrough signal and pixel data representing the level of a pixel signal, and subtracts the feedthrough data from the pixel data for each pixel. The result of this calculation (the pixel data corresponding exactly to the amount of the charge accumulated in each CCD cell) is output sequentially to the image processing section 16 as scan image data through the I/F circuit 90.

Further, light measurement signals of R, G, B are output in parallel from the line CCD 116. Therefore, there are provided three signal processing systems each including an amplifier 76; an A/D converter 82 and a CDS 88. The image data of R, G, B are output in parallel as scan image data to the image processing section 16 from the I/F circuit 90.

Further, the image processing section 16 is connected to the display 18, the keyboards 12A, 12B, the mouse 20 and the film carrier 38.

The image processing section 16 carries out the darkness correction and the brightness correction of the image data of R, G, B input thereto in parallel from the line CCD scanner 14.

The darkness correction is for canceling the dark current flowing in the line CCD 116 in a state where light is not incident on the light-incident side of the line CCD 116. The data (the data representing the dark output level of each cell of the sensing portions of the line CCD 116) input from the line CCD scanner 14 in a state where the light-incident side of the line CCD 116 is shielded by the CCD shutter 52 is stored for each cell. The darkness is corrected by subtracting the dark output level corresponding to each pixel from the image data input from the line CCD scanner 14 due to the line CCD 116 reading the photographic film 22.

The brightness correction, on the other hand, is for correcting the variations, from one cell to another, of the photoelectric conversion characteristic of the line CCD 116. With the film image for adjustment having a whole screen with a fixed density set in the line CCD scanner 14, the film image for adjustment is read by the line CCD 116. In this way, the gain (brightness correction data) for each cell is determined based on the image data (the density variations from one pixel to another represented by this image data is attributable to the variations in the photoelectric conversion characteristic of each cell) of the film image for adjustment input from the line CCD scanner 14. Thus, the image data of the film image to be read inputted from the line CCD scanner 14 is corrected for each pixel according to the gain determined for each cell.

Also, the image processing section 16 conducts various image processing including gradation conversion, color conversion, hypertone processing for compressing the tone of the ultralow frequency brightness component of the image, hypersharpness processing for emphasizing sharpness while suppressing granularity.

Further, the photographic film 22 corresponds to the original to be read according to the invention, the lamp 32 corresponds to a light source according to the invention, the film carrier 38 corresponds to conveyance means and an original conveyance apparatus according to the invention, the microprocessor 46 corresponds to control means according to the invention, the lens unit 50 corresponds to image-forming means according to the invention, the reading section driving motor 58 and the lens driving motor 60 correspond to moving means according to the invention, the ROM 70 corresponds to storage means according to the invention, the line CCD 116 corresponds to an image sensor according to the invention, the charts 140A, 140B corresponds to the object according to the invention, and the guide 142 corresponds to a limiting member according to the invention.

Next, the focus calibration processing executed by the microprocessor 46 of the line CCD scanner 14 as an operation of the present embodiment will be explained with reference to the flowchart of FIG. 9. This focus calibration processing is executed at the time of factory shipment of the image reading apparatus and executed again at the time of maintenance or the like of the image reading apparatus as required.

Figure 10:
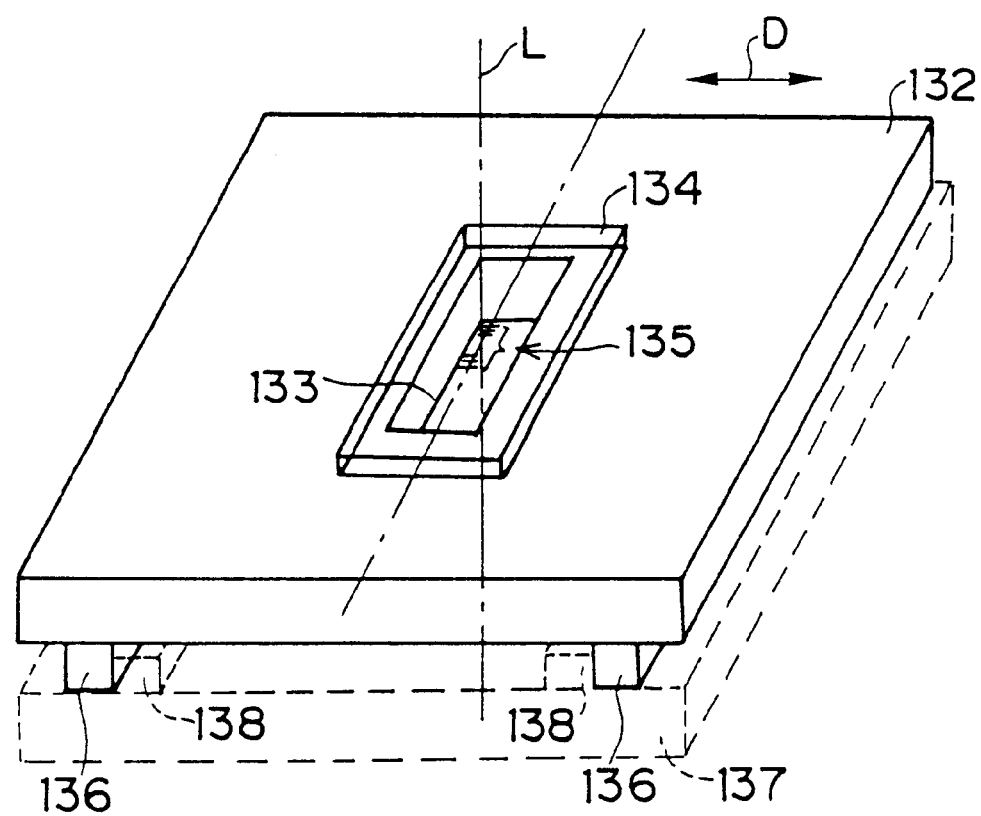
FIG. 10 is a perspective view schematically showing the configuration of a reference chart jig and the state in which the reference chart jig is mounted on the line CCD scanner.

First, in step 200, it is judged whether a reference chart jig 132 is loaded at a loading position of the film carrier 38 of the line CCD scanner 14. The reference chart jig 132, as shown in FIG. 10, is adapted to be loaded substantially the same way as the film carrier 38. The reference chart jig 132 is loaded as the rail 136 is guided by the guide rail 138 of the carrier table 137 (not shown in FIGS. 2 and 3) mounted on the line CCD scanner 14 for loading the film carrier 38. A glass plate 134 with the reference chart 135 arranged at the center thereof is attached on the upper part of an opening 133 formed substantially at the center of the reference chart jig 132. Thus, with the reference chart jig 132 loaded in the carrier table 137, the optical axis L coincides with the center of the reference chart 135. The reference chart 135 corresponds to the reference object according to the present invention.

Once the reference chart jig 132 is loaded at the loading position of the film carrier 38 of the line CCD scanner 14, the judgment in step 200 becomes affirmative, and the process proceeds to step 202, where the value of the optical magnification W is set at 0.6 as an initialization setting. In the next step 204, the internal temperature of the lens unit 50 (hereinafter referred to as the reference temperature) is detected by the lens temperature sensor 98 and stored in a predetermined area of the RAM 68. After that, in step 206, the focusing position search processing is conducted. Next, the focusing position search processing will be explained with reference to FIG. 11.

In step 250, the loading stand 47 and the lens unit 50 are slid by the reading section driving motor 58 and the lens driving motor 60, respectively, in such a manner that the optical magnification of the lens unit 50 assumes the value W.

Next, in step 252, the position of the loading stand 47 is slid to the search start position in the focusing position search area of the reference chart 135 provided in the reference chart jig 132 loaded in the line CCD scanner 14. The focusing position search area of the reference chart 135 is determined by experiments or the like for each optical magnification and stored in the ROM 70 beforehand. The microprocessor 46 reads the search area for the present optical magnification (=0.6×) from the ROM 70, and slides the loading stand 47 in such a manner that for example, the focal length is shortest in the search area, moving the loading stand 47 to the search start position. In this case, the search end position is the position where the focal length is longest in the search area.

Then, in step 254, the loading stand 47 begins to be slid at a predetermined speed toward the search end position by the reading section driving motor 58 to start thereby the search operation. In the next step 256, the lapse of a predetermined time is waited for. This predetermined time is regarded as the time required for sliding the loading stand 47 from the search start position to the search end position at the predetermined speed, divided into a plurality (6 in the present embodiment) of units.

After the lapse of the predetermined time, the determination in step 256 becomes affirmative, and the process proceeds to step 258. At this point, the image contrast value of the reference chart 135 read by the line CCD 116 is calculated and stored in a predetermined area of the RAM 68. The image contrast value according to this embodiment is the integrated value of the MTF (Modulation Transfer Function) in a predetermined spatial frequency domain of the image read.

Subsequently, in step 260, based on the positional information of the loading stand 47 derived from the reader unit position sensor 260, it is judged whether or not the loading stand 47 has reached the search end position or not. If not yet reached, the process returns to step 256, and the process of steps 256 to 260 is repeated until the search end position is reached. This repetitive process causes the image contrast value for a plurality (6 in the present embodiment) of points in the search area to be calculated and stored in the RAM 68.

When the loading stand 47 reaches the search end position, the determination in step 260 becomes affirmative, and the process proceeds to step 262, where the sliding of the loading stand 47 is stopped to end thereby the search operation. In the next step 264, the position associated with the maximum image contrast value is determined as the focusing position among the six positions in the search area in which the image contrast value of the RAM 68 is stored in steps 256 to 260. The position thus determined is stored in a predetermined area of the RAM 68 to end thereby the focusing position search processing.

Figure 12:
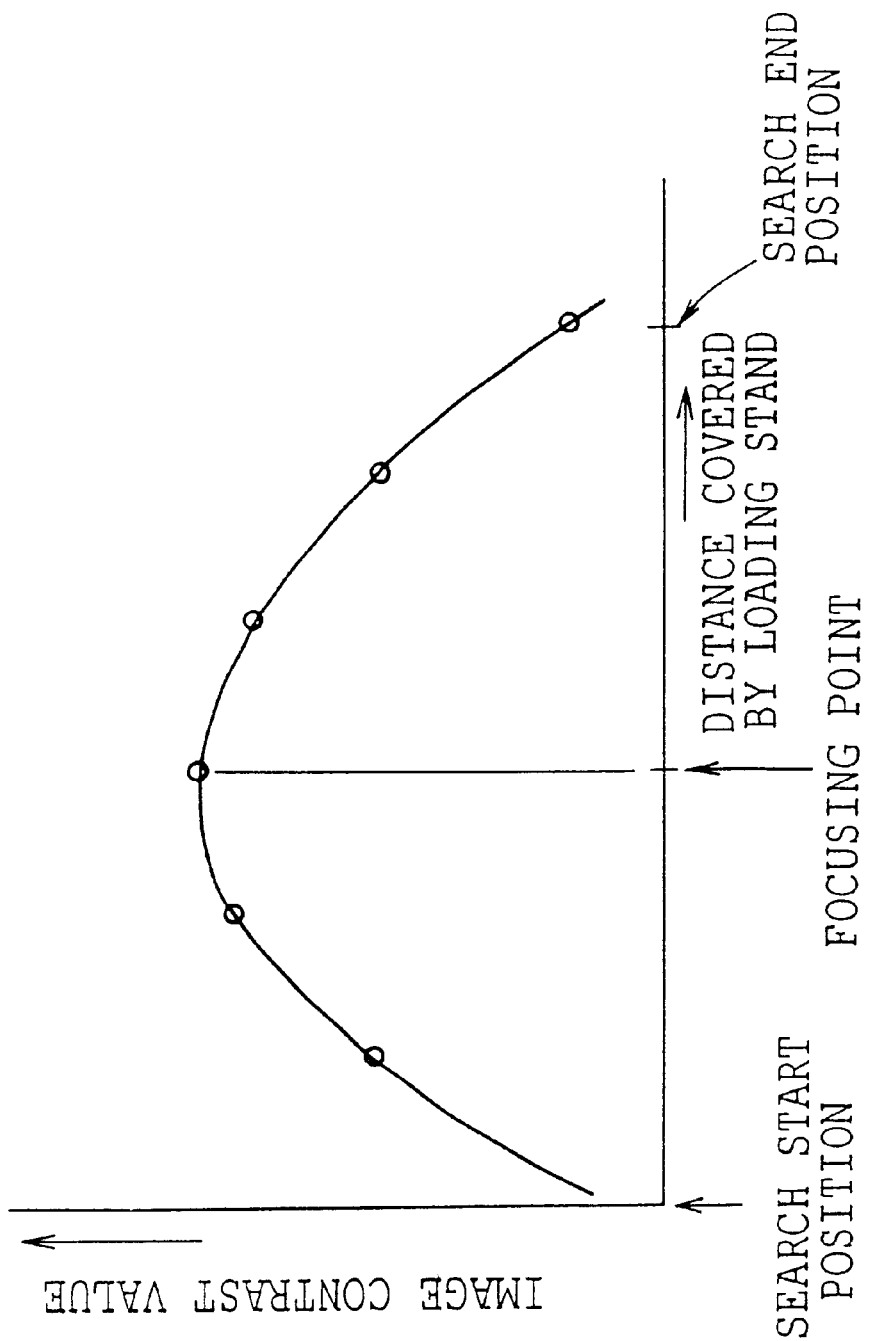
FIG. 12 is a graph showing the change of the image contrast value and the focusing point with the movement of a loading stand.

Namely, by the repetitive processing of steps 256 to 260, as shown in FIG. 12, the image contrast values are obtained at the six positions between the search start position and the search end position. Among these positions, the one associated with the maximum image contrast value is determined as the focusing position. In the case where the reading section driving motor 58 is a pulse motor, this focusing position can be expressed as the number of driving pulses (hereinafter referred to as the number of focusing pulses) of the reading section driving motor 58 for the movement of the loading stand 47 from the mechanical origin (hereinafter referred to as the origin H.P.). In the description that follows, reference is made to the case where the various positions of the loading stand 47 such as the focusing position are represented by the number of driving pulses.

Figure 9:
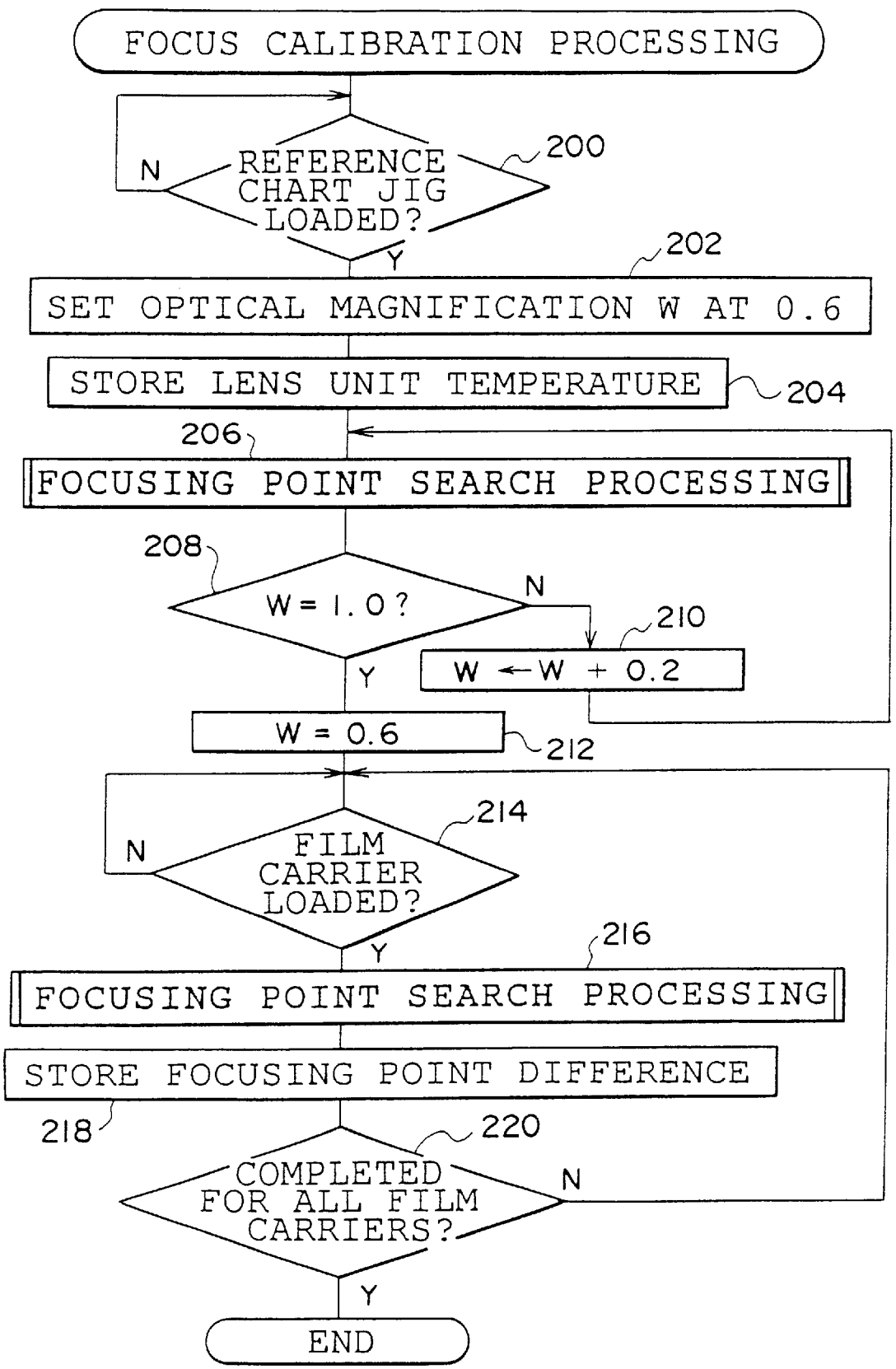
FIG. 9 is a flowchart for the focus calibration processing carried out by a microprocessor of the line CCD scanner according to the embodiment of the present invention.

Upon completing the focusing position search processing, the process proceeds to step 208 in FIG. 9 to determine whether the optical magnification W is 1.0 or not. In the case where it is not 1.0, the process proceeds to step 210 for increasing the value of the optical magnification W by 0.2, after which the process returns to step 206 for executing the focusing position search processing again. In the case where the value of the optical magnification W is 1.0, on the other hand, the process proceeds to step 212. Thus, as the result of the processing in steps 206 to 210, the focusing positions for three types of optical magnification W including 0.6, 0.8 and 1.0 are stored in a predetermined area of the RAM 68.

In step 212, the optical magnification W is set to 0.6. In the next step 214, it is determined whether one of a plurality of the film carriers prepared as usable for the line CCD scanner 14 has been loaded in the line CCD scanner 14 or not. In the process, the reference chart jig 132 is removed from the line CCD scanner 14. Also, a plurality of the film carriers according to this embodiment include those for photographic films of sizes 135 and 240 and a film carrier for the slide.

Figure 11:
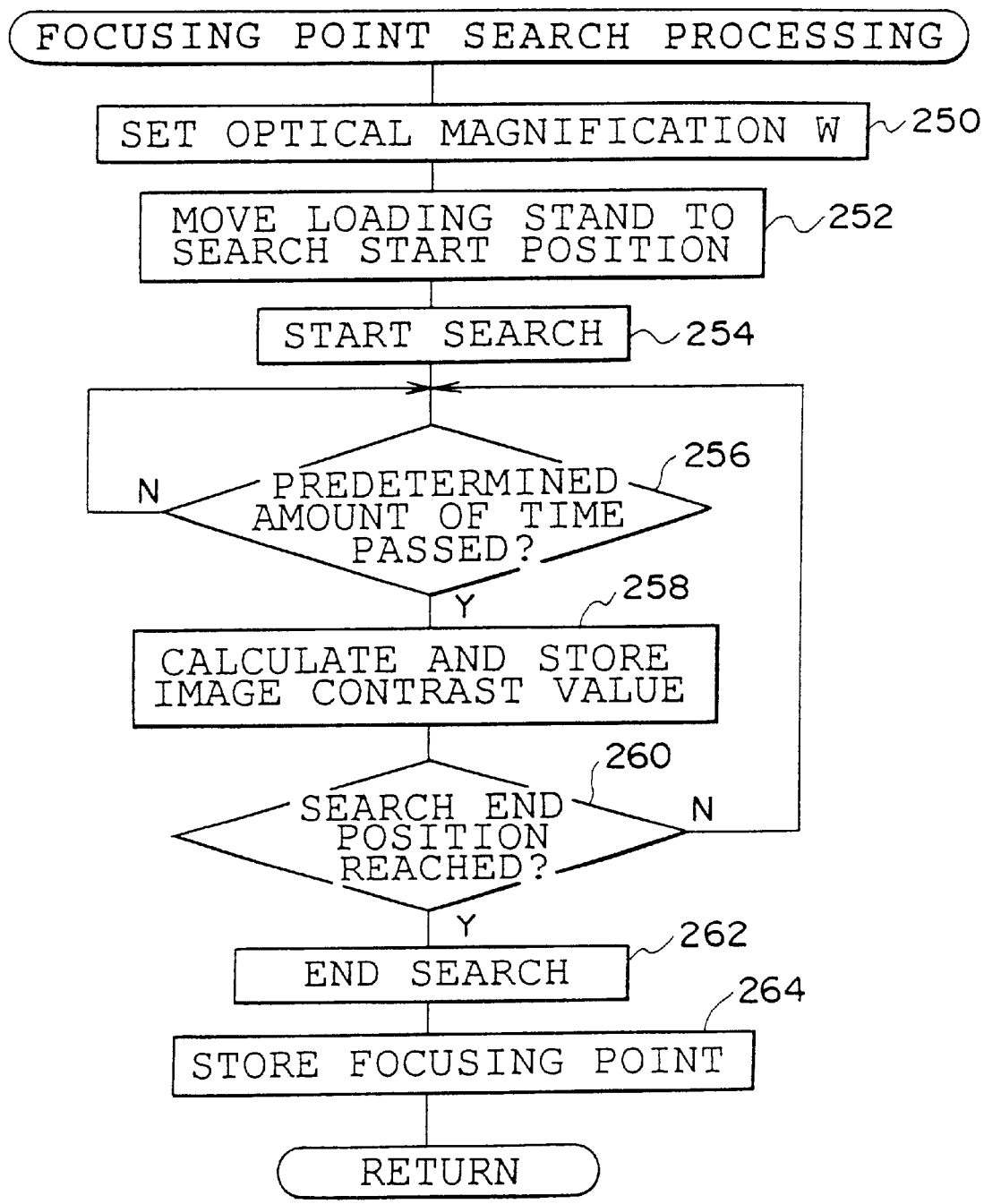
FIG. 11 is a flowchart for the focusing point search carried out during the focus calibration processing of FIG. 9.

Once any one of the film carriers is loaded in the line CCD scanner 14, the determination of step 214 becomes affirmative, and the process proceeds to step 216 for carrying out the focusing position search shown in FIG. 11. In the focusing position search processing, the focusing position associated with the optical magnification W of 0.6 is stored in the RAM 68 in accordance with the processing described above. In the processing, if the film carrier loaded in the line CCD scanner 14 is for the photographic film of size 135 or size 240, i.e. for a long photographic film, then the intermediate point between respective the focusing positions of the charts 140A and 140B arranged in the film carrier becomes the focusing position.

In the case where the film carrier loaded in the line CCD scanner 14 is for the slide, on the other hand, the thickness of the mount is different for each type thereof. Therefore, the position of the photographic film along the optical axis is varied with respect to a holding member (hereinafter called the mask) prepared for each type (size) of the photographic film in order to hold the mount in the film carrier. Also, since it is difficult to identify the type of the mount to be used, a representative mount is used for the focus calibration processing and the focusing position of a predetermined position (say, the central position) of the photographic film is stored in the RAM 68 for each type of mask.

Subsequently, in step 218, the difference between the focusing position for the reference chart 135 associated with the optical magnification W of 0.6 stored in the RAM 68 and the focusing position stored in the RAM 68 in step 216 (in the present embodiment, the focusing position obtained in step 216, less the focusing position of the reference chart 135 for the optical magnification W of 0.6 obtained in step 206). Thus, in step 218, a difference is stored which difference is the difference between the position of the chart (or the film image of the slide) of the film carrier loaded in the line CCD scanner 14 and the position of the reference chart 135 for the optical magnification W of 0.6.

In the next step 220, it is determined whether or not the process of steps 214 to 218 is completed for all the film carriers prepared, and in the case where it is not completed, the process returns to step 214 for executing the process of steps 214 to 218 for all the unprocessed film carriers, after which the focus calibration processing is ended.

Upon completion of the focus calibration processing, the difference between the focusing position (corresponding to the first value of the present invention) of the reference chart 135 for each optical magnification stored in the RAM 68 and the focusing position for each film carrier associated with the optical magnification of 0.6 is stored by the operator in the ROM 70 in a table. Then, the reference temperature stored in the RAM 68 in step 204 is stored in the ROM 70.

Table 1 shows an example of the focusing position of the reference chart 135 for each optical magnification stored as the table in the ROM 70 by the operator and the difference of the focusing position for each film carrier associated with the optical magnification of 0.6. In Table 1, the difference of the focusing positions is shown for the case in which the film carrier is for the slide and the case in which a mask is used for each of the photographic film of sizes 135 and 240. The table stored in the ROM 70 in this form is called the focus calibration table in the description that follows.

TABLE 1

|  |  |  | Optical magnification (x) | | |
|---|---|---|---|---|---|
|  |  |  | 0.6 | 0.8 | 1.0 |
| Focusing position of reference chart (number of focusing pulses) | | | 1500 | 2300 | 2500 |
| Difference | For size 135 | | 50 | — | — |
|  | For size 240 | | 90 | — | — |
|  | For slide | Size 135 | 100 | — | — |
|  |  | Size 240 | 70 | — | — |

By adding the difference of the focusing positions of the film carrier to the focusing position for each optical magnification of the reference chart 135 shown in Table 1, it is possible to determine a reference focusing position of the loading stand 47 (hereinafter referred to as the reference focusing position) for the focusing control at each optical magnification (0.6, 0.8, 1.0) for each film carrier (for each type of mask in the case of the film carrier for the slide).

Namely, the reference focusing position for the optical magnification of 0.6 of the film carrier for the photographic film of size 135 is 1550 (=1500+50), for example. In similar fashion, the reference focusing position for the optical magnification of 1.0 is 2550 (=2500+50), the reference focusing position for the optical magnification of 0.8 when the film carrier for the photographic film of size 240 is used is 2390 (=2300+90), and the reference focusing position for the optical magnification of 1.0 in the case where the mask for the photographic film of size 135 is used with the film carrier for the slide is 2600 (=2500+100).

Next, image reading processing for the photographic film executed by the microprocessor 46 of the line CCD scanner 14 will be explained with reference to the flowchart of FIG. 13. The line CCD scanner 14 has modes predetermined for reading the photographic film including "prescan mode" and "fine scan mode". Also, the state of each portion of the line CCD scanner 14 for each mode is predetermined. Further, according to this embodiment, explanation will be given about the case in which the photographic film 22 to be read is a single negative film of size 135.

Figure 13:
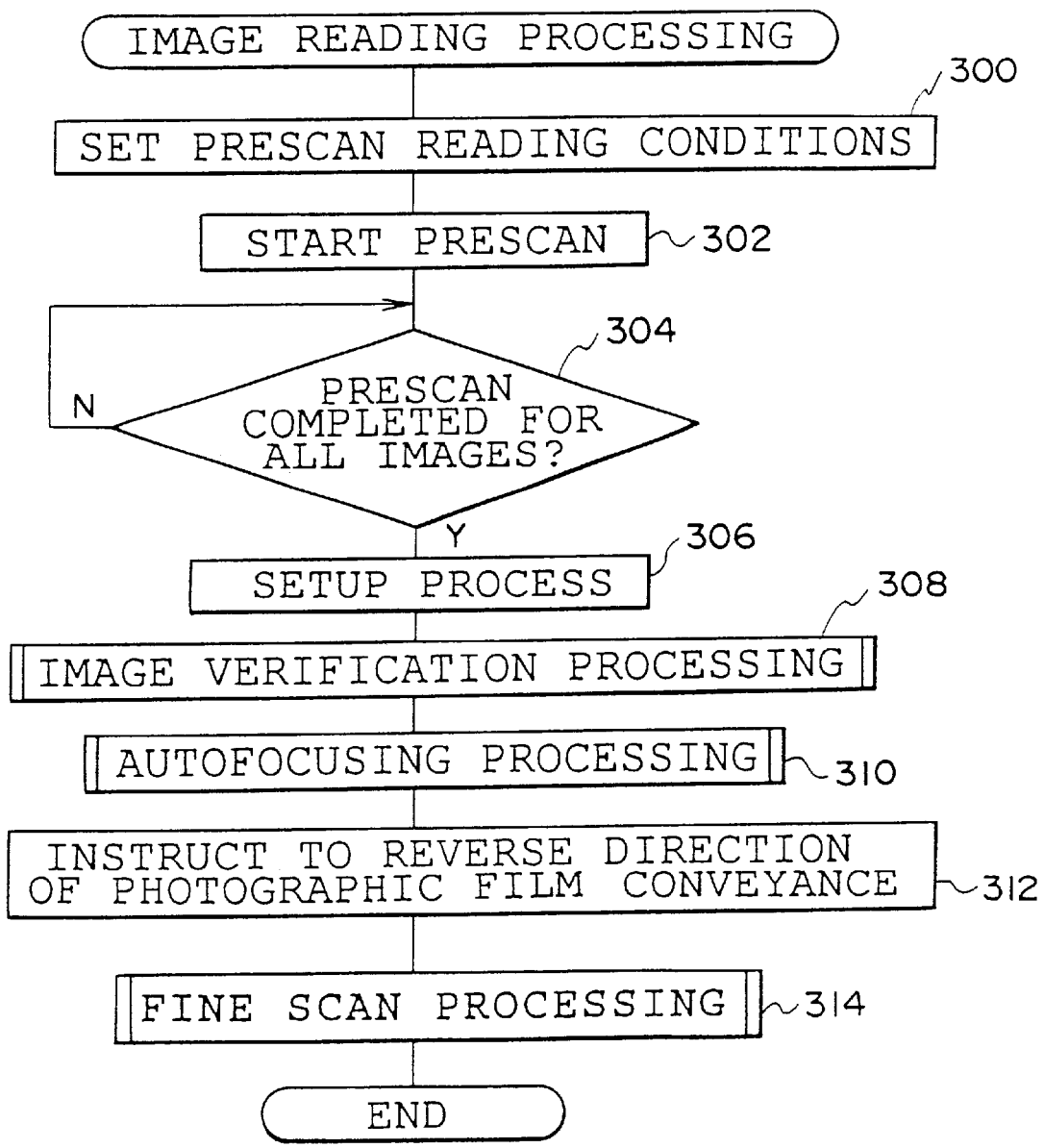
FIG. 13 is a flowchart for image reading processing executed in the microprocessor of the line CCD scanner according to the embodiment of the present invention.

In step 300 of FIG. 13, the process proceeds to "prescan mode", and operation of various portions is controlled in accordance with the state of each portion predetermined as "prescan mode" in such a manner that the prescan of the photographic film 22 is carried out under predetermined reading conditions.

Namely, the lamp 32 is turned on by the lamp driver 53, and the diaphragm 39 is moved to the position for prescan by the diaphragm driving motor 56. The turret 36 is rotated to the negative film position (the position where the balance filter 36N for negative film is located on the optical axis L) by the turret driving motor 54; the loading stand 47 and the lens unit 50 are slid by the reading section driving motor 58 and the lens driving motor 60 in such a manner as to secure the optical magnification of 1.0 for the lens unit 50. The lens diaphragm 51 is moved to full open position by the lens diaphragm driving motor 62, and the CCD shutter 52 is moved to full open position by the shutter drive motor 64. Also, the timing generator 74 is set to the shortest value t of the operation time of the electronic shutter of the line CCD 116 (the reading cycle (charge accumulation time) per line of the line CCD 116) and the film carrier 38 is set to 5×v (the conveyance speed five times as high as the normal conveyance speed v for fine scan of the film image) which is the maximum conveyance speed of the photographic film 22. As a result, the prescan of the photographic film 22 is carried out at high speed with a comparatively low resolution, thereby completing the processing within a short time.

In the next step 302, the film carrier 38 is instructed to convey the photographic film 22 in a predetermined direction (along the direction of arrow C in FIG. 2), the photographic film 22 conveyed at the maximum conveyance speed (5×v) is read by the line CCD 116 at the shortest reading cycle (t), and the signals output from the line CCD 116 are sequentially A/D converted. The resulting prescan data are sequentially output to the image processing section 16. In this way, the prescan is started.

In the next step 304, it is determined whether the prescan has been completed to the tail end of the photographic film 22 and the process is held until the determination becomes affirmative.

During the prescan, the image processing section 16 stores sequentially in a storage unit (not shown) the image data input thereto from the line CCD scanner 14. Also, at the time the image data representing a plurality of frame images is stored, edge positions of both ends (upstream and downstream sides) of the film image recorded on the photographic film 22, which ends are in the direction of conveyance of the photographic film 22, is determined based on the image data stored.

In determining the edge positions, as proposed by the present applicant in JP-A Nos. 8-304932, 8-304933, 8-304934 and 8-304935, the density change value along the longitudinal direction of the film is calculated for each pixel based on the density value of each pixel represented by the prescan data. The density change value along the longitudinal direction of the film for each pixel is integrated for each line along the transverse direction of the film, and the integrated value is compared for each line. Also, if the photographic film 22 is an APS film, the the area where an edge is likely to exist from the position where the perforation is formed is set as a search range, and the edge is searched for in the search range, thereby making it possible to reduce the time required for determining the edge position.

Also, the image processing section 16 determines the frame position of the film image corresponding to the position of the perforation or the like, based on the edge position thus determined, and stores the determined frame position in a storage unit (not shown). At the same time, based on the frame position, the image data for the area having the film image recorded therein is removed from the image data stored thus far and stored in the storage unit (not shown) described above.

Upon completion of prescan to the tail end of the photographic film 22 (when the determination in step 304 in FIG. 13 is affirmative), step 306 causes the image processing section 16 to calculate a predetermined image feature amount of the film image from the prescan image data stored during the prescan in the storage unit (not shown) described above. The predetermined image feature amount includes the color balance value (namely, the ratio of the minimum density value (maximum brightness value) for each component color of the film image) of the film image.

In step 306, the image processing conditions for the type (size or density type) of the film image and the fine scan image data are set by calculation in step 306.

Further, as long as the photographic film 22 to be read is of size 135, the size of the film image (the frame size of the film image, in the present embodiment) can be determined based on whether the density and the color for a predetermined portion included in the image recording range for a film image of the standard size and outside of the image recording range for a film image of non-standard size such as panorama size are the density and the color, respectively, corresponding to those of a non-exposed portion (a transparent portion in the case of a negative film).

Also, as disclosed in JP-A Nos. 8-304932, 8-304933, 8-304934 and 8-304935, the density change value along the transverse direction of the film is calculated for each pixel based on the density value for each pixel indicated by the image data at the time of prescan, the density change value along the transverse direction of the film for each pixel is integrated for each line along the length of the film, and the size of the film image (aspect ratio) is determined by comparing the integrated values for each line. As an alternative, the film image size is determined based on image presence in each area of the image by determining a threshold value from the density histogram and binarizing the image, or based on the distribution and the average of the density change value for the predetermined portion described above, or by any combination of the techniques described above.

Also, in the case where the photographic film 22 to be read is an APS film, the film image size (the print size in this case) can be determined by reading the print size magnetically recorded as data in the magnetic layer of the APS film.

The density type of the film image can be classified into low density, normal density, high density and ultrahigh density, for example, by comparing the average density, maximum density, minimum density, and the like with a predetermined value. Also, as processing conditions for image processing, processing conditions of image processing such as image enlargement or reduction rate, hypertone, hypersharpness or the like, (specifically, the gradation compression degree for the ultralow frequency brightness component of the image, the gain (emphasis degree) for the high frequency component or the intermediate frequency component of the image), and the gradation conversion conditions and the like are calculated.

Once the type and the image processing conditions are set completely for all the frame images as described above, image verification processing is executed in the next step 308. This image verification processing will be explained with reference to the flowcharts of FIGS. 14A and 14B.

First, in step 400, the prescan image data and the image processing conditions for a predetermined number of film images are fetched from the image processing section 16.

In the next step 402, the prescan image data and the image processing conditions for any one of the film images are taken out of the prescan image data and the image processing conditions for a predetermined number of the film images previously fetched. The prescan image data thus fetched is objected to predetermined image processing (enlargement/reduction of the image, gradation conversion, hypertone processing, hypersharpness processing, etc.) in accordance with the processing conditions taken out. This predetermined image processing is equivalent to the image processing carried out in the image processing section 16 for the fine scan image data. The prescan, however, is for reading the film image with a lower resolution than the fine scan, and the prescan image data is smaller in terms of data amount than the fine scan image data. The image processing in step 402, therefore, is completed within a comparatively short time.

In the next step 404, the image data that has been objected to the image processing are corrected in accordance with the characteristics of the display 18 in such a manner that the state (appearance) of the image data displayed on the display 18 is substantially similar to the result of printing by a laser printer (not shown), and the corrected data (simulation image data) are provisionally stored in the RAM 68.

In the next step 406, it is determined whether or not a predetermined number of film images have been objected to the processing described above. In the case where the determination is negative, the process returns to step 402, so that the processing of steps 402 and 404 is repeated for the film images not objected to the image processing among the predetermined number of images for which the prescan image data and the processing conditions have been fetched in step 400.

Figure 15:
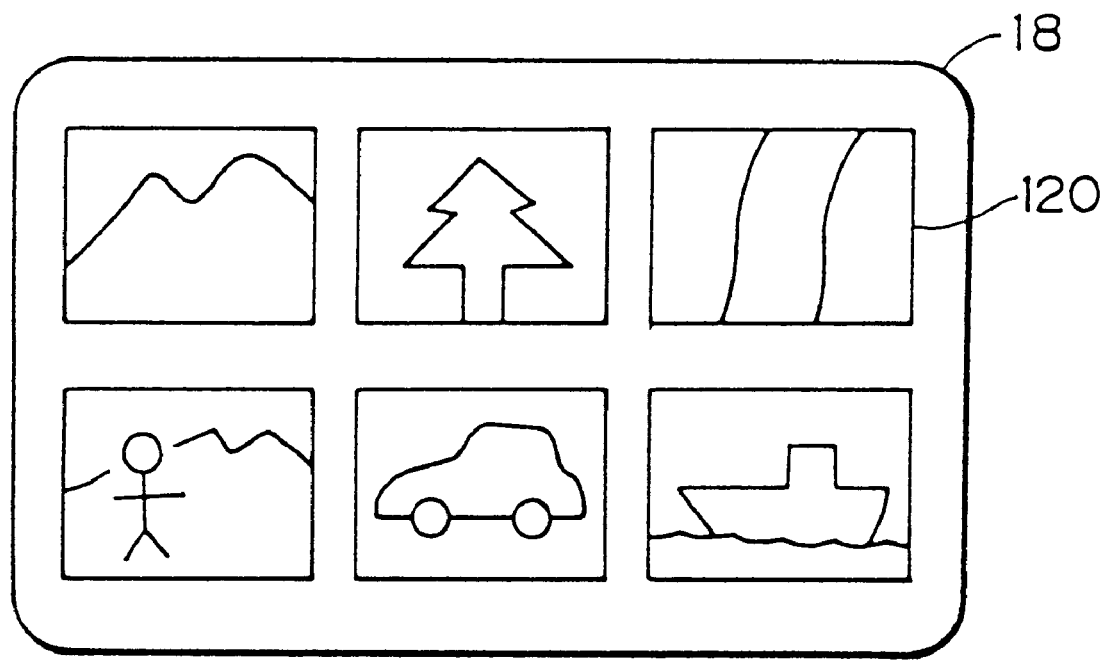
FIG. 15 is a schematic diagram showing an example of a display state of a display unit at the time of executing the image verification processing according to the embodiment of the present invention.

In the case where the determination in step 406 is affirmative, the process proceeds to step 408, in which a predetermined number (6 in FIG. 15) of simulation images 120 indicating the result of processing the image data of a predetermined number of film images as shown in FIG. 15, for example, based on the simulation image data of the predetermined number of film images under the processing conditions set in the image processing section 16 are displayed on the display 18.

In the next step 410, it is determined whether or not the designation by the operator of the images to be processed among the simulation images 120 displayed on the display 18 is completed, and in the case where the designation is so completed, the process proceeds to step 418. Otherwise, the process proceeds to step 412. The images to be processed according to the present embodiment indicate the film images to be actually fine scanned. Specifically, according to the present embodiment, in the case where the image reading processing is executed simultaneously with printing, the images to be processed are other than those film images that would be meaningless to print, such as those considerably out of focus, or those whose contents cannot be identified due to being excessively underexposed or excessively overexposed. In the case where this image reading processing is executed at the time of extra printing, on the other hand, the images to be processed are those to be subjected to extra printing.

In step 412, either a message is displayed on the display 18 requesting the operator to designate the images to be processed, or the operator is otherwise requested to designate the images to be processed.

As a result, the operator designates the images to be processed among the simulation images 120 (see also FIG. 15) displayed on the display 18, by way of the keyboard 12A, 12B or the mouse 20. Specifically, in the case where the keyboard 12A or 12B is used, a frame is displayed in advance by which to define an image chosen at will among the simulation images 120 displayed on the display 18. One of arrow keys (not shown) on the keyboard is pressed so that the frame is moved to define the simulation image located in the direction indicated by the arrow key depressed. At the time point when the simulation image to be processed comes to be defined by the frame, a predetermined key such as an ENTER key of the keyboard is pressed thereby to designate the image to be processed. In the case where the mouse is used, on the other hand, the image to be processed among the simulation images 120 displayed on the display 18 is designated by being pointed to, using the mouse 20.

By the way, in the case where the image reading processing is executed simultaneously with printing, as described above, the film image to be printed is the image to be processed. In such a case, the images to be printed are generally greater in number than other images. For the purpose of saving labor, therefore, it is desirable that the operator designates images other than those to be printed so that the microprocessor 46 decides that images other than those designated are the images to be processed. This method is effective from the viewpoint of saving labor also in the case where the images to be subjected to extra printing are smaller in number than those not to be subjected to extra printing assuming that the image reading processing is executed at the time of extra printing. Also, in the case where the image reading processing is executed at the time of extra printing, the operator inputs the number of extra prints of each image to be processed at this point in time.

Further, the operator inputs the message that the designation is over at the point in time when the designation of all the images to be processed has been completed. This input operation can be performed by pressing a predetermined key such as a SPACE key on the keyboard (at the very least, a key other than the arrow keys described above), for example, in the case where the keyboard is used for designation of the images to be processed. In the case where the images to be processed are designated by use of the mouse 20, on the other hand, the same operation can be performed by designating by pointing with the mouse 20 to a predetermined area other than the area of the simulation image 120 on the display 18, for example.

As a result, in the next step 414, the input from the operator for designation of the images to be processed as described above is awaited. After thus waiting for the designation of the images to be processed to be completed, the process proceeds to step 416, where the positions of all the images to be processed (the frame numbers of the images to be processed according to the present embodiment) designated by the operator are stored in a predetermined area of the RAM 68. Also, in the case where the image reading processing is executed at the time of extra printing, the number of extra prints to be printed of each of the images to be processed input by the operator is stored correspondingly to the respective images to be processed, respectively.

In the next step 418, the simulation images corresponding to the positions of the film images to be processed which are designated by the operator and stored in steps 412 to 416 are highlighted.

Figure 16A:
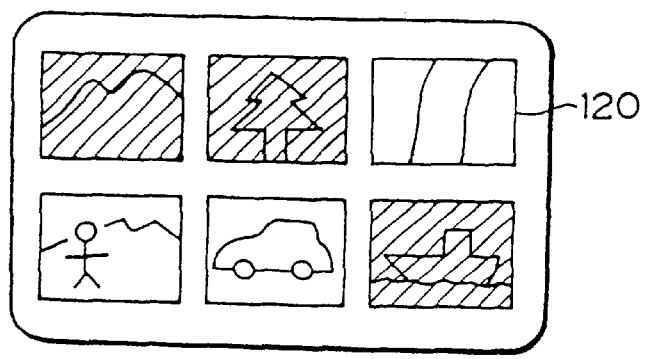
FIGS. 16A to 16D are schematic diagrams showing examples of highlighting a simulation image corresponding to a film image to be processed as designated by the operator.
Figure 16B:
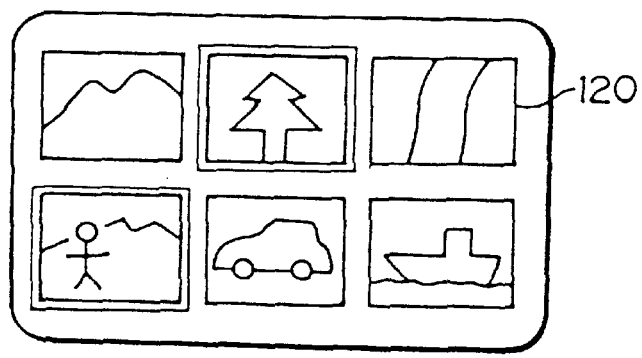
Figure 16C:
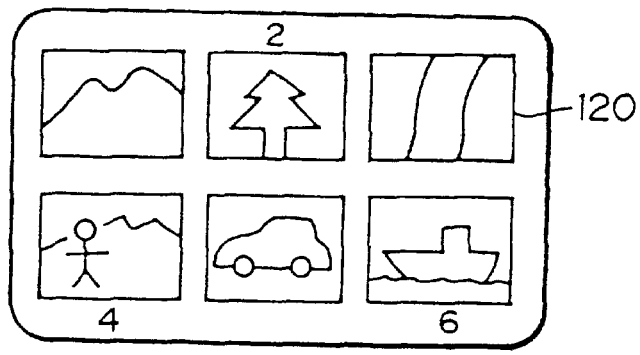
Figure 16D:
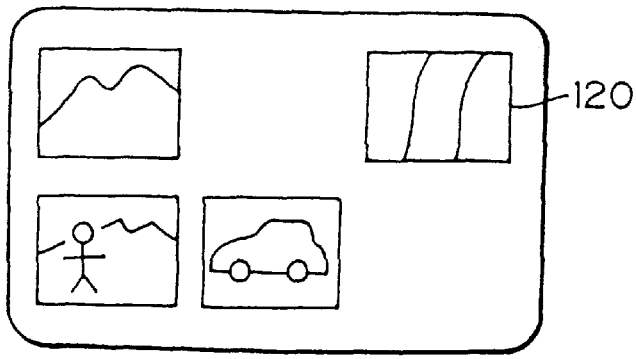

The simulation images are highlighted by the following methods, for example: a method in which as shown in FIG. 16A, the designated simulation images are displayed relatively brighter than the simulation images not designated (in FIG. 16A, the simulation images not designated are displayed darker (hatched)); a method in which as shown in FIG. 16B, only the designated simulation images are defined by a frame; a method in which as shown in FIG. 16C, only the designated simulation images are displayed with frame numbers on the photographic film of the simulation image; and a method in which as shown in FIG. 16D, only the designated simulation images are displayed. These methods of highlighting can clarify the images to be processed.

In the next step 420, either a message requesting the operator to verify the simulation image is displayed on the display 18 or the operator is otherwise requested to verify the simulation image.

As a result, the operator visually checks the image highlighted in step 418 among those simulation images displayed on the display 18, and after various determinations, conducts the verification work by inputting the result of the determinations. Specifically, first, it is determined whether the frame position of the film image determined in the image processing section 16 is proper or not. In the case where the frame position is determined to be proper, it is determined whether the quality of the simulation image is proper or not (i.e. whether the processing conditions calculated in the image processing section 16 are proper or not), and in the case where the image quality (processing conditions) is not proper, it is decided how the processing conditions are to be corrected.

In the case where it is determined that the frame positions and the image quality of all the simulation images highlighted are proper, the operator inputs information indicating "verification OK" by way of the keyboard 12A or the like as the result of verification. In the case where it is determined that the frame position of a specific simulation image is not proper, on the other hand, information indicating how the frame position of the specific simulation image is to be corrected is input by way of the keyboard 12A or the like as the result of verification. In the case where the determination is that the quality of a specific simulation image is not proper, information instructing the processing conditions to be corrected for a specific film image corresponding to the specific simulation image is input by way of the keyboard 12A or the like as the result of verification.

A film image taken using a strobe, or a film image taken of a black-lit scene, for example, has excessively high contrast, so that the background of the main object in the simulation image is lightened, or alternatively, darkening occurs. In such cases, the operator inputs information instructing the correction of the degree of highlighting for the high-brightness data among the ultralow frequency brightness components of the image, as information instructing correction of the processing conditions in such a manner that the gradation of only the area corresponding to the background of the image is compressed, i.e. in such a manner that the gradation compression degree is high for the ultralow brightness component of the image resulting from the hypertone processing (the high brightness area in the image of ultralow frequency brightness component extracted from the image).

Also, in the case where the sharpness of the simulation image is insufficient, for example, the operator inputs information instructing the correction of the degree of highlighting for the high frequency components or the like of the image, as information instructing the correction of processing conditions in such a manner as to emphasize the sharpness. Further, the simulation images for the underexposed or overexposed film images, for example, has a density generally sided to high density or low density, or has an excessively low contrast. In such cases, the operator inputs information instructing correction of the conversion curve of the gradation conversion conditions as information instructing correction of the processing conditions in such a way that the density and the contrast become proper as a whole.

In the next step 422, it is determined whether the verification result is input by the operator through the keyboard 12A or the like or not, and if not, the input of the verification result is waited for. When the verification result is input, the process proceeds to step 424 for determining the contents of the information input as the verification result. In the case where information instructing correction of the frame position or the processing conditions for a specific film image corresponding to a specific simulation image is input as the result of verification, the process proceeds to step 426 where the contents of the correction of the frame position or the processing conditions, as the case may be, for the specific film image thus input are reflected in the frame position or the processing conditions, respectively, obtained in the image processing section 16.

Namely, in the case where the input instruction for correction is one for instructing correction of the frame position of a specific film image, the frame position of the specific film image is corrected in compliance with the correction instruction, after which as in step 306 described above, the prescan image data is cut out again from the prescan data in accordance with the corrected frame position, and a predetermined image feature amount is calculated from the prescan image data thus cut out, and the type of the specific film image and the image processing conditions are set again. By correcting the frame position in the manner described above, the image portion on the photographic film 22 can be accurately read at the time of fine scan.

In the case where the instruction input for correction is one for correcting the processing conditions of a specific film image, only the processing conditions of the particular specific film image are corrected. If the instruction for correcting the processing conditions is one for correcting the degree of emphasizing a specific frequency component, for example, the degree of emphasizing the corresponding frequency component is corrected among the image processing conditions. In the case where the instruction for correcting the processing conditions is one for correcting the conversion curve of the gradation conversion conditions, on the other hand, the conversion curve indicating the gradation conversion conditions among the image processing conditions is wholly or partially corrected in accordance with the instruction for correction. As a result, the proper processing conditions can be accurately set for each film image.

Upon the contents of the correction of the frame position or the processing conditions are reflected in the manner described above completely, the process proceeds to step 428, where the prescan image data and the processing conditions for the specific film image for which the frame position or the processing conditions have been corrected are fetched from the image processing section 16 and the process returns to step 402.

As a result, the process of steps 402, 404 is executed again for the specific film image of which the frame position or the processing conditions have been corrected, and the simulation image of the specific film image is redisplayed on the display 18. The operator visually checks the simulation image of the specific film image thus redisplayed. Thus, the operator can easily judge whether the contents of the instruction for correction previously input are proper or not. At this time, the image to be processed has already been designated. Therefore, the determination in step 410 is affirmative, and the process proceeds to step 418, skipping steps 412 to 416. Thus, the simulation image corresponding to the position of the image to be processed already stored in the RAM 68 is highlighted.

The process of steps 402 to 428 is repeated until the frame position and the image quality of all the simulation images highlighted on the display 18 are judged to be proper in compliance with the instructions of the operator, and the information indicating "verification OK" is input as the verification result (until the determination in step 424 becomes negative). In this way, the frame position and the processing conditions of each film image corresponding to the simulation image highlighted are corrected in compliance with the operator instruction. When the information indicating "verification OK" is input by the operator by way of the keyboard 12A or the like and the determination in step 424 becomes negative, the process proceeds to step 430 for determining whether all the film images recorded in the photographic film 22 to be read are verified or not. In the case where this determination is negative, the process returns to step 400, and the process of and subsequent to step 400 is repeated. Consequently, the image to be processed among the film images recorded in the photographic film 22 to be read (the image to be fine scanned according to the present embodiment) is designated while at the same time carrying out the image verification processing for the images to be processed. Thus it is determined whether the frame position determined and the processing conditions calculated in the image processing section 16 are proper or not, while at the same time correcting the frame position and the processing conditions as required.

Upon completion of the image verification processing described above (when the determination in step 430 becomes affirmative), autofocusing processing is executed in step 310 of FIG. 13. This autofocusing processing will be explained with reference to the flowchart of FIG. 17 and the model diagram of FIG. 18.

First, in step 450 of FIG. 17, the focusing point (=1500) of the reference chart 135 for the optical magnification (0.6 in the present embodiment) similar to the main optical magnification for fine scan and the difference (=50) of the film carrier for the photographic film of size 135 are read from the focus calibration table (Table 1) stored in the ROM 70 based on the focus calibration processing shown in FIG. 9, and the two values are totaled to acquire thereby a reference focusing point (see FIG. 18 also) while at the same time reading the reference temperature from the ROM 70.

Figure 19:
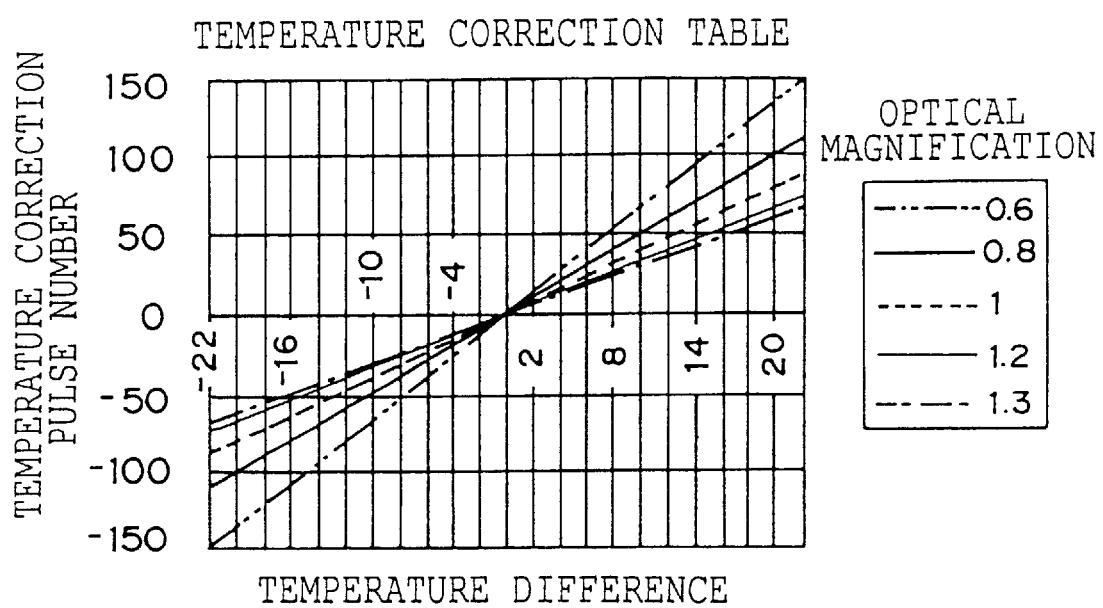
FIG. 19 is a graph showing the value of a temperature correction pulse with respect to the temperature difference of the lens unit according to the embodiment of the present invention.

In the next step 452, the internal temperature of the lens unit 50 is obtained by the lens temperature sensor 98, followed by step 454 in which a temperature correction pulse is obtained based on the temperature difference between the reference temperature and the internal temperature of the lens unit 50 obtained in steps 450 and 452, respectively. As is well known, the lens focusing point is varied depending on the temperature at a gradient corresponding to the optical magnification. It is necessary, therefore, to correct the reference focusing point in accordance with the temperature difference. In view of this, according to the present embodiment, as shown in FIG. 19 as an example, a temperature correction table in which the change amount of the loading stand 47 along the optical axis L with respect to the temperature difference for various optical magnifications of the lens unit 50 is indicated by the number of driving pulses (hereinafter referred to as the number of temperature correction pulses) of the reading section driving motor 58 is stored in the ROM 70 in advance. In step 454, the number of temperature correction pulses with respect to the temperature difference at the optical magnification for fine scan is read from the ROM 70.

Once the temperature correction pulse is acquired, in the next step 456, the reference focusing point (=1550) acquired in step 450 and the number of temperature correction pulses acquired instep 454 are added to each other, thereby determining a predicted focusing point (see also FIG. 18) obtained by correcting the variations of the focusing point, which are due to the temperature difference between the present time point and the time of focus calibration.

In the next step 458, a search area for an actual focusing point is set with reference to the predicted focusing point determined as above. According to the present embodiment, the dimension of the area along the optical axis in which search for a focusing point is stored in the ROM 70 in advance for each type of film carrier. This value is read out and the search area (see FIG. 18 also) is set with the predicted focusing point as a center thereof.

Upon completion of setting the search area, in the next step 460, the loading stand 47 is slid to the search start position in the search area by the reading section driving motor 58. The microprocessor 46 causes the loading stand 47 to be slid in such a manner as to minimize the focal length in the search area to move thereby the loading stand 47 to the search start position. In this case, the search end position is where the focal length is longest in the search area (see also FIG. 18).

In step 462, the reading section driving motor 58 starts the search operation by starting to slide the loading stand 47 at a predetermined speed toward the search end position. In step 464, the process is held to wait for the lapse of a predetermined amount of time. This predetermined amount of time is regarded as the time for which the loading stand 47 slides at the predetermined speed from the search start position to the search end position, divided into a plurality of time units (6 time units in the present embodiment).

With the lapse of the predetermined amount of time (when the determination in step 464 becomes affirmative), the process proceeds to step 466. Each image contrast value of the charts 140A and 140B (see FIGS. 5A and 5B) read by the line CCD 116 at this time is calculated and stored in a predetermined area of the RAM 68. The image contrast value according to the present embodiment is an integrated value of MTF in a predetermined spatial frequency domain in the image read.

In the next step 468, based on the positional information of the loading stand 47 derived from the reader unit position sensor 59, it is determined whether the loading stand 47 has reached the search end position or not. In the case where the loading stand 47 has not reached the search end position, the processing returns to step 464. This processing of steps 464 to 468 is repeated until the loading stand 47 reaches the search end position. As the result of this repetitive processing, the image contrast values of the charts 140A, 140B at a plurality of points (6 points according to the present embodiment) in the search area are calculated and stored.

When the loading stand 47 reaches the search end position (when the determination in step 468 becomes affirmative), the process proceeds to step 470 for stopping the loading stand 47 to end thereby the search operation. In the next step 472, a position with the highest image contrast among the six reading positions in the search area of the charts 140A and 140B where the image contrast value is stored in the RAM 68 as the result of the processing of steps 464 to 468 is determined as the focusing point for each chart. Thereafter, the arithmetic mean of the focusing points for each chart is determined as an overall focusing point for the chart (see also FIG. 18).

Figure 20:
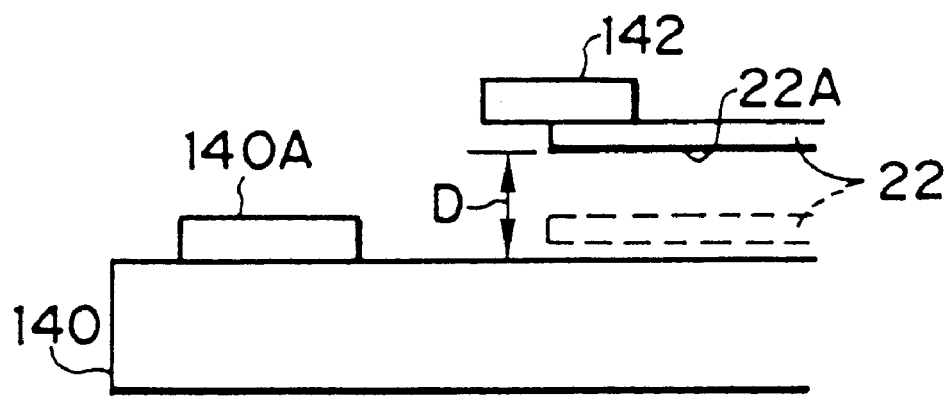
FIG. 20 is a schematic side view for explaining the range of fluttering of the photographic film at the reading position.

In the next step 474, the loading stand 47 is moved by a distance representing an offset OF corresponding to the distance equal to one half of the fluttering range D (corresponding to the displacement range in the present invention, see FIG. 20) of the photographic film along the optical axis L with respect to the overall focusing point. Further, in order to remove the backlash of the drive system of the loading stand 47, the loading stand 47 is moved in the reverse direction by a predetermined distance, so that the loading stand 47 is stopped at a final stop position (see FIG. 18). At the same time, the number of driving pulses (corresponding to a third value according to the present invention) indicating the position of the loading stand 47 at this time is stored in the RAM 68, and then the autofocusing processing is terminated.

Further, the distance between the guides 142 and the glass member 140 of the film carrier according to the present embodiment is set in such a manner that the fluttering range D of the photographic film 22 along the optical axis L is not more than twice the depth of field of the lens unit 50 (3 mm in the present embodiment). The distance equal to one half of the fluttering range D is offset with respect to the overall focusing position described above. Even in the event that the actual position of the emulsion surface 22A of the photographic film 22 is deviated a maximum degree from the final stop position of the loading stand 47 due to the fluttering of the photographic film 22 during the conveyance thereof, therefore, such a deviation is always contained in the range of the depth of field of the lens unit 50, and therefore the image quality of the film image ultimately obtained poses no problem.

Through a structure in which the distance between the guides 142 and the glass member 140 is substantially equal to the thickness of the photographic film 22, the fluttering described above can be prevented. When conveying the photographic film 22 at high speed, however, the friction between the photographic film 22, the glass member 140 and the guides 142 would increase to such an extent that smooth conveyance becomes impossible. Also, in a structure where a plurality of photographic films are coupled so that a multiplicity of film images of the photographic films are read continuously, the thickness of the tape for coupling the photographic films must also be taken into account. For these reasons, the distance between the guides 142 and the glass member 140 is required to be larger than the thickness of the photographic film.

Figure 21:
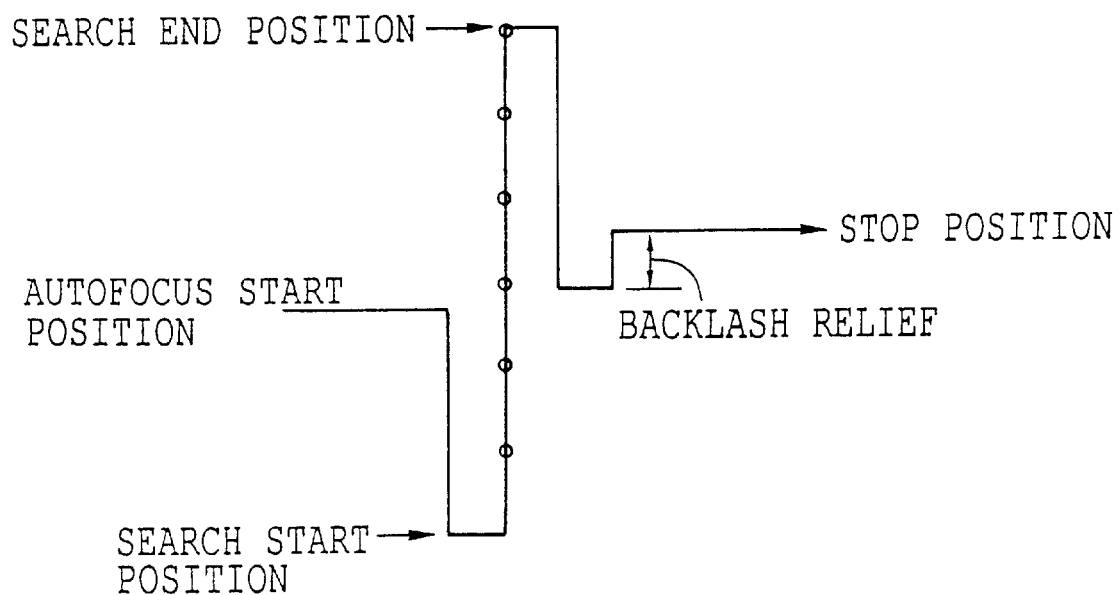
FIG. 21 is a schematic diagram showing the manner in which the loading stand moves during the period from the start to the stop position of autofocusing.

FIG. 21 shows the manner in which the loading stand 47 moves in the autofocusing processing. As shown, the loading stand 47 moves from the initial position (expressed as the autofocus start position) to the search start position in the search area in step 460 of FIG. 17, and then moves at a predetermined speed to the search end position. In the process, the microprocessor 46 calculates and stores the image contrast value based on the image data obtained by the line CCD 116 at predetermined time intervals. After that, the loading stand 47 moves toward a position offset by OF with respect to the focusing point determined in step 472. Then in order to remove the backlash of the drive system of the loading stand 47, the loading stand 47 is moved in the reverse direction by a predetermined distance and comes to a stop at the final stop position.

Figure 22B:
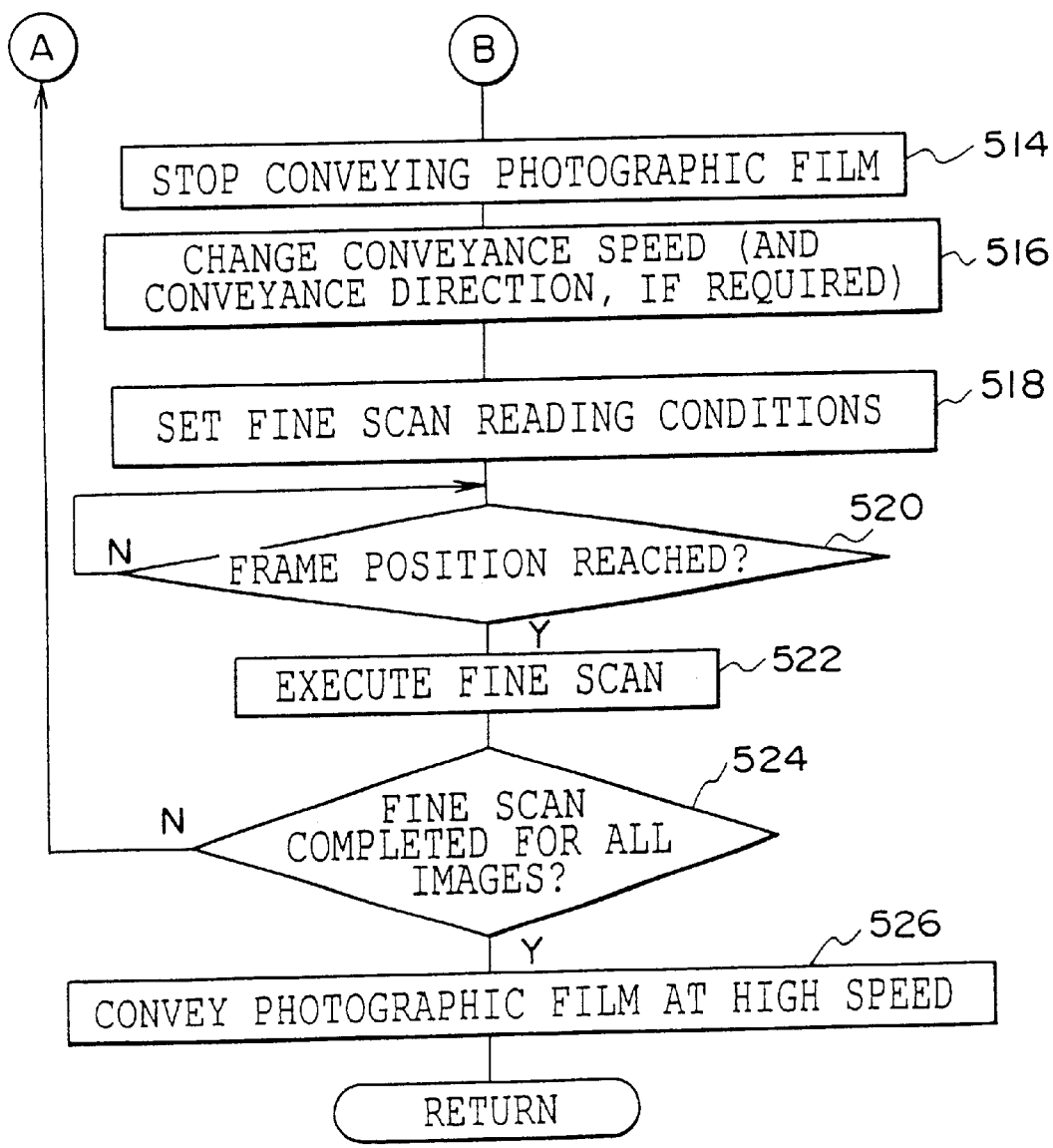

Upon completion of the autofocusing processing, in step 312 of FIG. 13, the film carrier 38 is instructed to convey the photographic film 22 in the reverse direction of the predetermined direction (the reverse direction of the direction of arrow C in FIG. 2) in preparation for the fine scan of the film image, followed by step 314 for executing the fine scan processing. By the way, in the fine scan processing according to the present embodiment, during times other than the period for reading the film image to be read, the photographic film 22 is conveyed by the film carrier 38 at maximum speed (5×v) thereof thereby to shorten the overall fine scan processing time. Now, the fine scan processing will be explained with reference to the flowcharts of FIGS. 22A and 22B.

First, in step 500, the type of the film image to be fine scanned (in this case, the film image to be processed which first arrives at the reading position by the conveyance of the photographic film 22 in the direction reverse to the predetermined direction) is fetched, the type of the film image is determined, and the position on the photographic film 22 (hereinafter referred to as the determinable position) located at the reading position at the time when the reading conditions can be set according to the type is calculated.

Specifically, in the fine scan processing for the image reading apparatus according to the present embodiment, the state of each part of the line CCD scanner 14 is set for each film image in accordance with the type of the film image. This setting requires a time of a length corresponding to the contents to be set. Therefore, if the setting of each portion is started from the time when the leading end of the film image to be next read along the conveyance direction arrives at the reading position, the film image cannot be read. In step 500, the position on the photographic film is determined at which the setting of the state of each portion can be completed prior to reading the film image in accordance with the type of the film image next to be read.

Specifically, according to the present embodiment, the speed at which the photographic film 22 is conveyed by the film carrier 38 is set at a constant value, i.e., the conveyance speed v for fine scan. At the same time, in accordance with the type of the film image to be read, the light amount of the lamp 32 is adjusted by the diaphragm 39 while at the same time adjusting the charge accumulation time of the line CCD 116 by an electronic shutter included in the line CCD 116. In step 500, the position on the photographic film 22 upstream of the leading end of the film image to be fine scanned along the direction of conveyance, by the distance covered by the photographic film 22 during the period when adjustment is possible, is calculated.

Further, the speed at which the photographic film 22 is conveyed may be switched in accordance with the density or the like of the film image to be read.

In the next step 502, it is determined whether the determinable position of the film image to be fine scanned calculated in step 500 is located downstream of the photographic film 22 along the direction of conveyance with respect to the reading position, and in the case where it is located downstream, the process proceeds to step 504 for starting the high-speed conveyance of the photographic film 22, after which the process proceeds to step 512. The conveyance speed in the process is 5×v like the conveyance speed for prescan, i.e. the maximum speed of the film carrier 38.

In the case where the determination in step 502 is that the determinable position is not located downstream, on the other hand, the process proceeds to step 506 for determining whether the determinable position is located upstream of the photographic film 22 along the direction of conveyance with respect to the reading position, and if it is located upstream, the process proceeds to step 508 for instructing the film carrier 38 to reverse the direction in which the photographic film 22 is conveyed. In the next step 510, the photographic film 22 starts to be conveyed at normal speed (v) and then the process proceeds to step 512. Specifically, the direction in which the photographic film 22 is conveyed in this case is along the arrow C of FIG. 2, as in the case of prescan.

In step 512, the process is held until the determinable position calculated in step 500 reaches the reading position. After that, the process proceeds to step 514 for stopping the conveyance of the photographic film 22. In the case where the determination in step 506 is that the determinable position is not located upstream along the direction of conveyance, on the other hand, the determinable position is regarded to be located at the reading position, and the process proceeds to step 514 for stopping the conveyance of the photographic film 22.

Namely, in the case where as the result of the process of steps 500 to 514, the determinable position of the film image to be fine scanned is located downstream of the reading position along the direction of conveyance of the photographic film 22 for fine scan, the photographic film 22 is conveyed at the maximum speed of the film carrier 38 until the determinable position reaches the reading position. In similar fashion, in the case where the determinable position is located upstream, the photographic film 22 is reversed so that the determinable position comes to be located at the reading position.

In the next step 516, the photographic film 22 begins to be conveyed after the speed at which the photographic film 22 is conveyed by the film carrier 38 is switched to the conveyance speed (v). In this case, if the direction in which the photographic film 22 is conveyed is not the direction of conveyance for fine scan, i.e. if it is determined in step 508 that the direction in which the photographic film 22 is conveyed is along the arrow C of FIG. 2, then the conveyance is started after instructing the film carrier 38 to reverse the direction of conveyance.

In step 518, operation of various portions of the line CCD scanner 14 is controlled in such a manner that the film image to be processed is fine scanned under the reading condition suitable for the type of the film image to be fine scanned. Specifically, the fine scan mode is set in accordance with the type of the film image to be fine scanned.

Also, in the case where the optical magnification of the film image to be fine scanned is different from the present optical magnification in step 518, the loading stand 47 and the lens unit 50 are slid in such a manner as to attain the optical magnification of the film image to be fine scanned. After that, the loading stand 47 is slid based on the number of driving pulses indicating the position at which the loading stand 47 is finally stopped by the autofocusing processing of FIG. 17 and the value in the focus calibration table (Table 1) acquired by the focus calibration processing.

Namely, assume that the optical magnification of the film image to be fine scanned is 1.0 and the present optical magnification and the optical magnification for auto focus are 0.6. The focusing position (=2500) of the reference chart 135 for the optical magnification of 1.0, less the focusing position (=1500) of the reference chart 135 for the optical magnification of 0.6 (=1000), is added to the number of driving pulses (say, 1560) indicating the position of the loading stand 47 where it is ultimately stopped by the autofocusing processing. The loading stand 47 is slid to the position corresponding to the resulting value (=2560), whereby the loading stand 47 can be set to the focusing point corresponding to the optical magnification of the film image to be fine scanned.

Assume, on the other hand, that the optical magnification of the film image to be fine scanned is 0.6 and the present optical magnification and the optical magnification for auto focus are 0.6. The focusing point (=2500) of the reference chart 135 for the optical magnification of 1.0, less the focusing point (=1500) of the reference chart 135 for the optical magnification of 0.6 (=1000), is subtracted from the number of driving pulses (say, 2560) indicating the position where the loading stand 47 is ultimately stopped by the autofocusing processing. The loading stand 47 is slid to the position corresponding to the resulting value (=1560), whereby the loading stand 47 can be set to the focusing position corresponding to the optical magnification of the film image to be fine scanned.

As described above, according to the present embodiment, in the case where the optical magnification of the film image to be fine scanned is different from the present optical magnification, the loading stand 47 and the lens unit 50 are moved to attain the optical magnification of the film image, after which the loading stand 47 is further moved to adjust the focusing point. In such a case, therefore, the time for these settings must be taken into account when calculating the determinable position in step 500.

In the next step 520, it is determined whether the edge of the film image to be fine scanned has reached the reading position (the position on the optical axis) of the line CCD 116 based on the frame position stored in the storage unit (not shown) of the image processing section 16, and the process is held until the determination becomes affirmative.

Once the determination in step 520 becomes affirmative, the process proceeds to step 522, and the film image that has reached the reading position is read by the line CCD 116. The signals output from the line CCD 116 are sequentially A/D converted and sequentially output to the image processing section 16 as fine scan image data. In this way, the fine scan is conducted. As a result, the film image can be fine scanned under the optimum reading conditions for each type of the film image.

Further, the fine scan image data output to the image processing section 16 from the line CCD scanner 14 are processed as an image in the image processing section 16 under the processing conditions previously stored, and output to and printed in a laser printer section (not show). Also, in the case where the image reading processing is executed at the time of extra printing, the number of extra prints of each image to be processed, which number was input by the operator at the time of the image verification processing, is output to the laser printer section, thereby printing the number of photographs as designated for each image to be processed.

Upon completion of the fine scan for a single film image, the process proceeds to step 524 for determining whether the fine scan is complete for all the film images to be processed designated by the operator in the image verification processing. In the case where the determination is negative, the process returns to step 500 for repeating steps 500 to 524. In steps 500 to 524, each film image is fine scanned under the optimum reading conditions corresponding to the type of each film image to be processed designated by the operator in the image verification processing. Once the determination in step 524 is affirmative, the process proceeds to step 526 for instructing the film carrier 38 to convey the photographic film 22 at high speed (5×v in the present embodiment). Thus, the photographic film 22 is delivered at high speed, and then the fine scan processing is terminated to end thereby the image reading processing shown in FIG. 13.

Figures 23A, 23B:
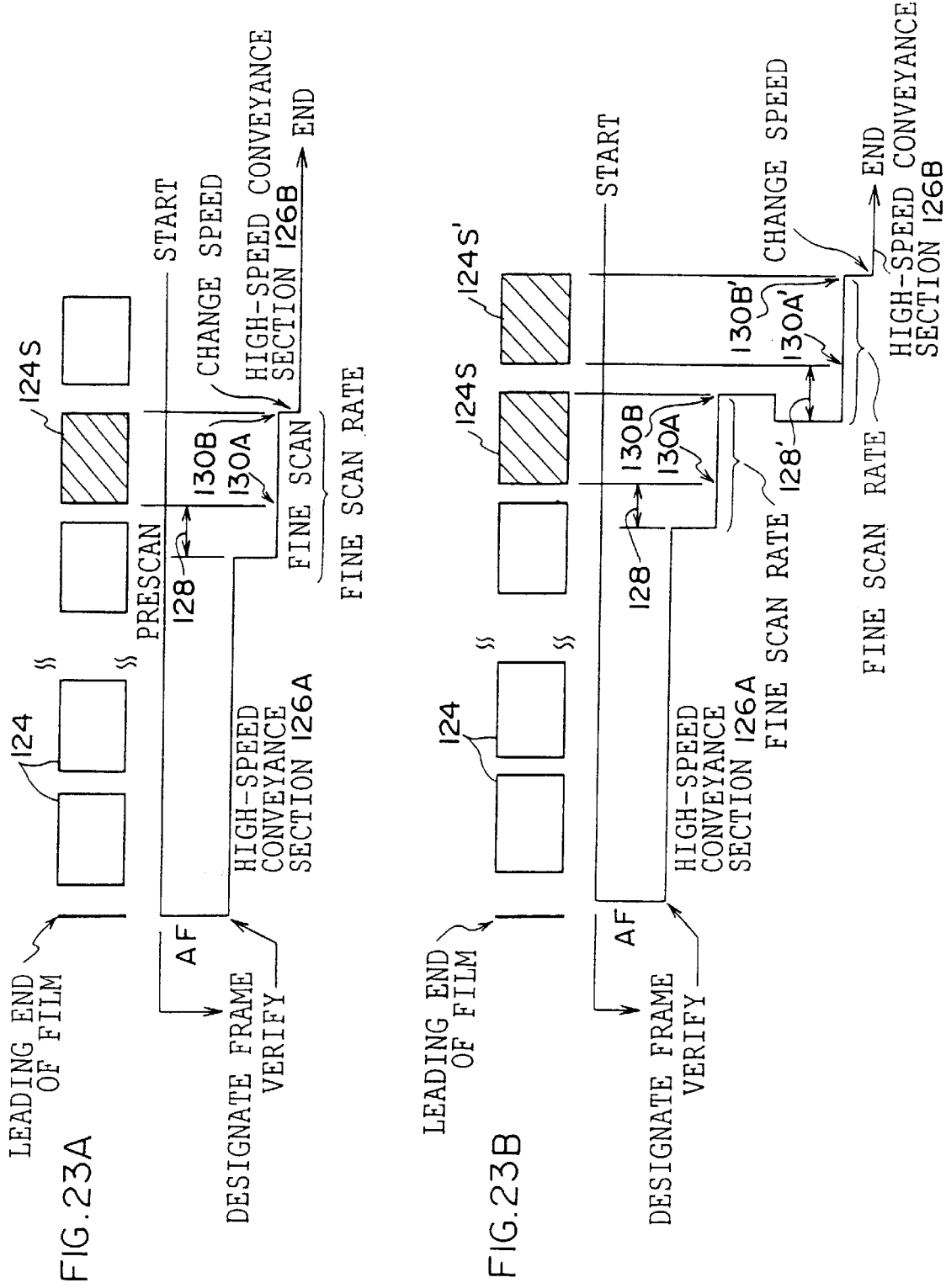

Next, with reference to FIGS. 23A and 23B, an explanation will be given of the manner in which the image reading processing is executed in the case where there is one image to be processed (one film image to be fine scanned) and in the case where there are two adjacent images to be processed and each portion cannot be normally set in time suitably for the second image to be read. FIGS. 23A and 23B are schematic diagrams showing the movement of the reading position relative to the photographic film, with arrows indicating "start" to "end".

Figure 14A:
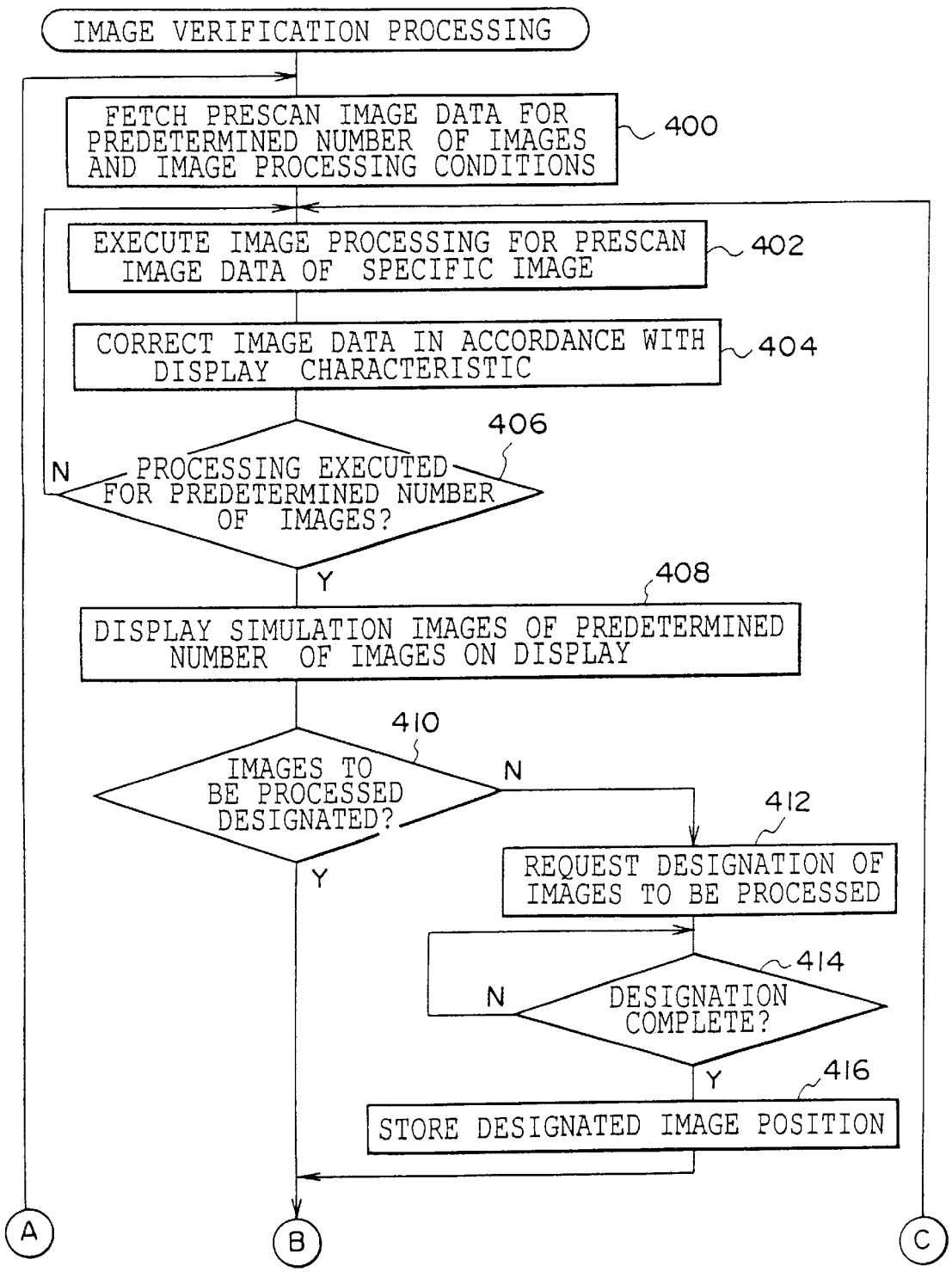
FIGS. 14A and 14B are flowcharts for the image verification processing executed during the image reading processing of FIG. 13.
Figure 14B:
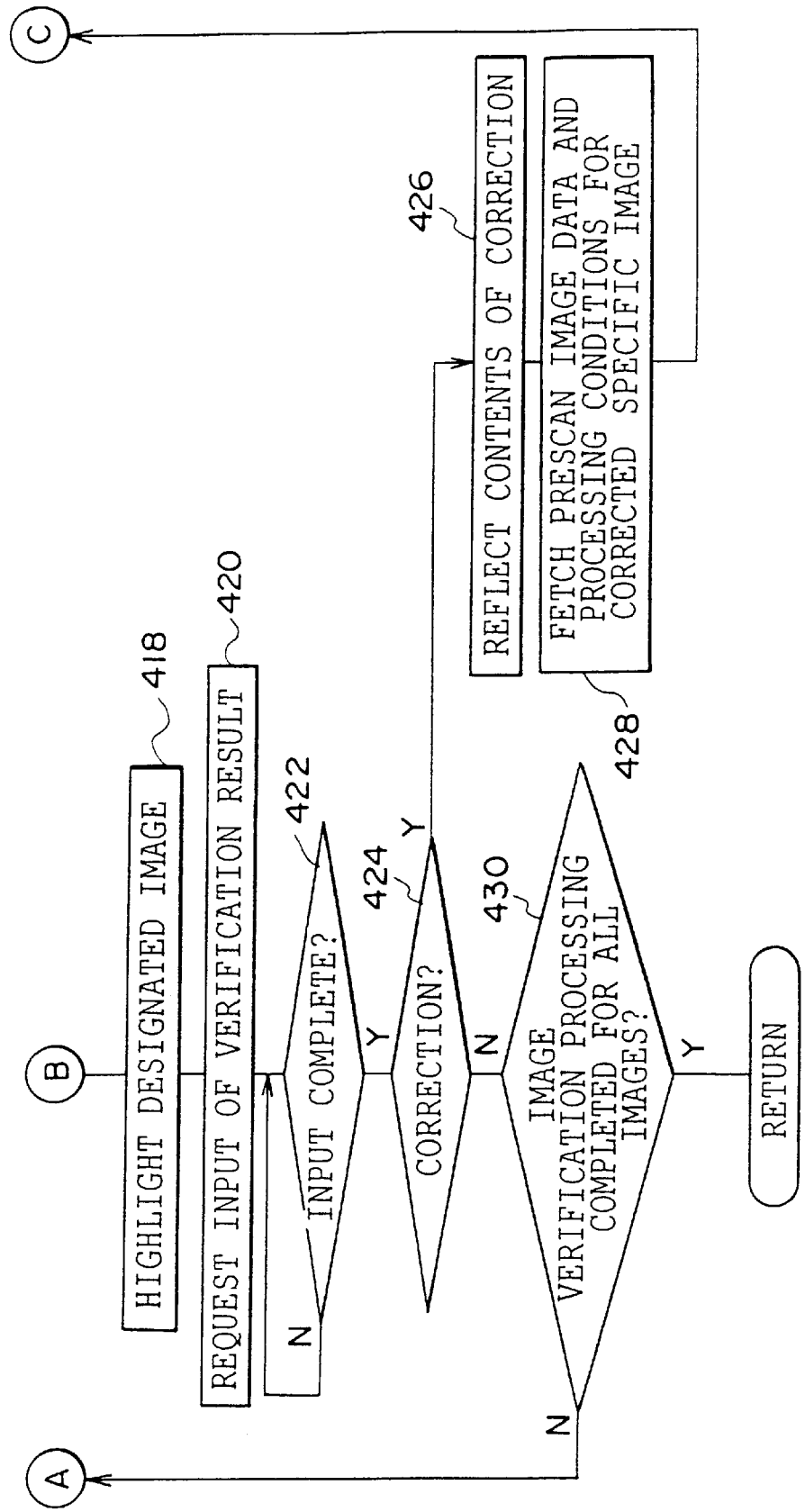

In the case where there is only one image to be processed, as shown in FIG. 23A, all the film images of the photographic film 22 conveyed at the speed (5×v in the present embodiment) predetermined for prescan are prescanned, after which the film image to be processed (the film image 124S in FIG. 23A) is designated by the image verification processing shown in FIGS. 14A and 14B, the designated film image 124S is verified, and the auto focus process is executed using the charts 140A, 140B (expressed as AF in FIG. 23A).

Thereafter, the photographic film 22 begins to be conveyed in the reverse direction of conveyance of the photographic film 22, so that the photographic film 22 is conveyed at high speed (5×v in this embodiment) for the high-speed conveyance section 126A from the reading start position 130A of the image 124S to be processed to a position upstream by a distance corresponding to the determinable section 128, which corresponds to a time in which each portion can be set in accordance with the type of the image 124S to be processed and the optical magnification.

Thereafter, the conveyance speed of the photographic film 22 is switched to the speed (expressed as the fine scan speed in FIG. 23A) suitable for the type of the image 124S to be processed. At the same time, each portion is set in accordance with the type of the image 124S to be processed and the optical magnification. Then, the image 124S to be processed is read for the section from the reading start position 130A to the reading end position 130B. After that, the photographic film 22 is conveyed at high speed (5×v in the present embodiment) for the high-speed conveyance section 126B and delivered from the film carrier 38.

On the other hand, in the case where there are two adjacent images to be processed and each portion cannot be set in time in a manner suitable for the second image to be read: as shown in FIG. 23B, all the film images 124 of the photographic film 22 conveyed at the speed for prescan (5×v in the present embodiment) are prescanned, after which the film images to be processed (the film images 124S and 124S' in FIG. 23B) are designated by the image verification processing shown in FIGS. 14A and 14B, the designated film images 124S and 124S' are verified, and the autofocusing processing (expressed as AF in FIG. 23B) is carried out using the charts 140A, 140B.

Thereafter, the photographic film 22 begins to be conveyed in the reverse direction. The photographic film 22 thus is conveyed at high speed (5×v in the present embodiment) for the high-speed conveyance section 126A from the reading start position 130A of the image 124S to be processed to a position upstream by a distance corresponding to the determinable section 128, which corresponds to a time in which each portion can be set in accordance with the type of the image 124S to be processed and the optical magnification.

Thereafter, the speed at which the photographic film 22 is conveyed is switched to a speed (expressed as the fine scan speed in FIG. 23B) suitable for the type of the image 124S to be processed. At the same time, each portion is set in accordance with the type of the image 124S to be processed and the optical magnification. After that, the image 124S to be processed is read for the section from the reading start position 130A to the reading end position 130B.

Upon completion of reading of the image 124S to be processed, the photographic film 22 would be normally conveyed at high speed until it reaches the section for reading the next image 124S' to be processed. In this case, however, as shown in FIG. 23B, in view of the fact that the next image 124S' to be processed is adjacent to the image 124S to be processed and the like, each portion cannot be set in accordance with the type of the image 124S' to be processed and the optical magnification for the section from the reading end position of the image 124S to be processed to the reading start position 130A' of the image 124S' to be processed. Thus, the photographic film 22 is conveyed in the reverse direction to a position upstream by a distance corresponding to the determinable section 128', which corresponds to a time in which setting is possible for the image 124S' to be processed.

Thereafter, the direction in which the photographic film 22 is conveyed is switched again to the direction of conveyance for fine scan, so that the photographic film 22 begins to be conveyed at a fine scan speed suitable for the type of the image 124S' to be processed. At the same time, each portion is set in accordance with the type of the image 124S' to be processed and the optical magnification. After that, the image 124S' to be processed is read for the section from the reading start position 130A' to the reading end position 130B'. Then, the photographic film 22 is conveyed at high speed (5×v in the present embodiment) for the high-speed conveyance section 126B and delivered from the film carrier 38.

As described in detail above, with an image reading apparatus according to the present embodiment, a plurality of focusing points (focusing pulses) for each of a plurality of optical magnifications for a chart located at a predetermined reading position can be obtained based on the focusing point (focusing pulse) for each of a plurality of optical magnifications for a reference chart stored as a focus calibration table and on the difference of each of the film carriers for one of a plurality of the optical magnifications. Therefore, the focusing control is not required for each optical magnification for a chart located at the reading position, and the focus calibration table can be prepared within a short time. Also, a focusing point corresponding to the optical magnification of a film image to be read can be set by moving the loading stand to a position determined based on the focusing point for each of a plurality of optical magnifications for the reference chart and on the difference described above. As compared with the case in which the focusing is controlled for each film image to be read, therefore, the focusing point can be set within a short time, thereby making it possible to reduce the overall processing time.

Also, with an image reading apparatus according to the present embodiment, it is not necessary to store the focusing point for each of a plurality of optical magnifications for each film carrier in the focus calibration table. Therefore, the storage capacity of the focus calibration table can be reduced.

Further, with the image reading apparatus according to the present embodiment, the focusing control for a chart is carried out prior to the fine scan, and the focusing point involved is stored. In the case where the optical magnification of the image next to be read is different from the present optical magnification, the loading stand is moved to a position based on the focusing point for each of a plurality of optical magnifications for the reference chart and on the focusing point for each of the plurality of optical magnifications, on the difference described above and on the focusing point for the chart. Thus, an optimum focusing point can be set in accordance with the actual environment in which reading is carried out.

Further, with the image reading apparatus according to the present invention, a chart is arranged in the vicinity of the surface of the conveyance passage of the photographic film of the film carrier, the range of displacement of the photographic film along the optical axis is limited to not more than one half of the depth of field the lens unit, by a guide arranged in the vicinity of the film carrier. At the same time, the distance equal to one half of the range of displacement is offset with respect to the position determined based on the focusing point for each of a plurality of optical magnifications for the reference chart and on the focusing point for each of the plurality of optical magnifications. Even in the case where the position of the photographic film along the optical axis is displaced a maximum degree, therefore, the deviation of the focusing point from the correct focusing point with respect to the film image is included in the range within the depth of field of the lens unit, with the result that image data of high image quality can be obtained.

In the image reading apparatus according to the present embodiment, during autofocusing processing, variation in the focusing position based on the temperature difference between the time of autofocusing processing and the time of focus calibration is corrected. Thus, in comparison with a case in which this correction is not performed, a more accurate predicted focusing point can be set.

Also, a film carrier according to the present embodiment includes a chart that is a reference for focusing control of a film image recorded in the photographic film at a position readable by the image reading apparatus other than the conveyance passage of the photographic film. It is thus possible to remove the effect of warping or the like of the photographic film when the focusing of the film image is controlled directly. In this way, high quality image data are obtained. At the same time, the focusing point can be controlled simultaneously with the reading of the film image recorded in the photographic film.

Further, the film carrier according to the present embodiment includes a chart arranged on each one of the two sides of the conveyance passage. Even in the case where the center of the focusing point for each chart is at the focusing point of the photographic film and the film carrier is loaded in the image reading apparatus while being tilted with respect to the main scanning direction, therefore, the focusing point for a main object located substantially at the center of the photographic film can be accurately obtained, generally.

The present embodiment was explained above with reference to the case in which the focusing point is offset by the offset amount OF (see FIG. 18) at the time of autofocusing processing. However, the present invention is not limited to such a case, and can be structured to reflect the offset OF, for example, in the focusing point of the reference chart 135 or in the difference in the focus calibration table (Table 1) prepared at the time of focus calibration processing.

Second Embodiment

In the above-described first embodiment, the embodiment was explained wherein a guide 142 is provided as shown in FIG. 5A, to set a fluttering range of the photographic film 22 along the optical axis L during conveyance thereof to be not more than twice the depth of field of the lens unit 50, and the loading stand 47 is moved only by distance equal to the offset OF corresponding to the distance equal to one half of the fluttering range D of the photographic film along the optical axis L, during the loading stand moving processing of step 474 in the autofocusing processing shown in FIG. 17, with the object of improving the image quality of the film image ultimately obtained. However, a second embodiment will be explained hereinafter wherein in order to achieve the same object, a difference in position in the optical axis direction between the chart and an image surface on the photographic film from which the image is actually read is obtained in advance, and the loading stand 47 is moved only by the difference. Movement of the loading stand 47 by the distance equal to the offset OF is not carried out.

Figure 24:
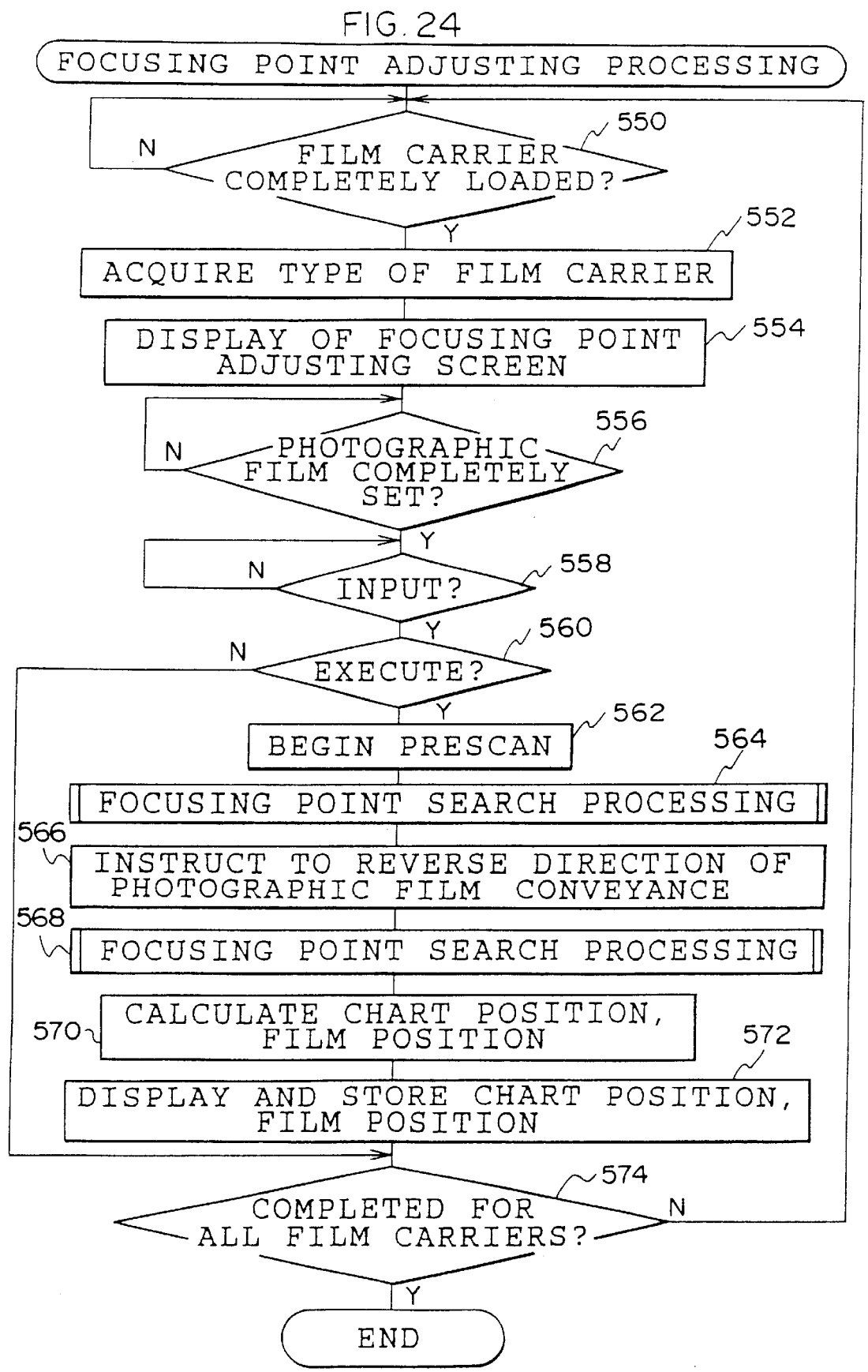
FIG. 24 is a flowchart of focusing point adjusting processing effected before effecting the image reading processing of FIG. 13, in a second embodiment.

First, the microprocessor 46 provided at the line CCD scanner 14 carries out focus point adjusting processing shown in FIG. 24, before carrying out the image reading processing (see FIG. 13).

In step 550 of FIG. 24, it is determined whether one of the plurality of the film carriers prepared in advance as film carriers that can be used in the line CCD scanner 14 has geen loaded in the line CCD scanner 14.

When one of the film carriers is loaded in the line CCD scanner 14, the determination of step 550 is affirmative and the process advances to step 552, where the type of the film carrier is acquired. As a result, the microprocessor 46 can specify the type of the film carrier loaded.

Subsequently, in step 554, the type of the film carrier acquired in the above step 552 is displayed in the "******" portion in a focusing point adjusting screen 150. Further, the difference between the focusing point of the chart for a predetermined optical magnification (in the present embodiment, 1.0) and a focusing point of a reference chart for the predetermined magnification obtained in focus calibration processing is displayed in the "####" after "chart position." The difference between the focusing point of a photographic film as an object to be read in the predetermined optical magnification and the focusing point of the chart is recorded in the "####" after "film position."

Subsequently, in step 556, loading of the photographic film as the object to be read with respect to the film carrier loaded is waited for, and upon loading of the photographic film, the process advances to step 558, in which inputting by the operator is awaited.

When the focusing point adjusting screen 150 shown in FIG. 25 is displayed on the display 18, the operator uses the mouse 20 to indicate "execute" in the focusing point adjusting screen 150 in cases where focusing point adjusting is carried out after the photographic film as the object to be read is loaded in the film carrier. The operator uses the mouse 20 indicates "cancel" in the focusing point adjusting screen 150 in cases where the focusing point adjustment is not carried out.

After inputting of "execute" or "cancel" by the operator, the determination of step 558 is affirmative and the process advances to step 560, where it is determined whether the instruction inputted is "execute." If the instruction is "execute" (in the case of an affirmative determination) the process advances to step 562. If the instruction is not "execute" (in the case of a negative determination) it is judged that "cancel" was input, and the process advances to step 574, which will be described later.

In step 562, prescan is begun, and in the subsequent step 564 focusing point search processing (see FIG. 11) with respect to the chart of the film carrier loaded is carried out. As a result, the focusing point of the chart of the film carrier loaded can be obtained.

Subsequently, in step 566, an instruction is given to the film carrier to reverse the direction the photographic film is conveyed. Next, in step 568, focusing point search processing is carried out for the loaded photographic film. As a result, the focusing point of the photographic film can be obtained.

Subsequently, in step 570, the chart position and the film position are calculated. Further, in the present embodiment, the difference between the focusing position of the chart for a predetermined optical magnification (in the present embodiment, 1.0) and the focusing point of a reference chart for the predetermined optical magnification obtained by focus calibration processing is calculated as the chart position. The difference between the focusing position of the photographic film as the object to be read for the predetermined optical magnification and the focusing position of the chart is calculated as the film position.

Thereafter, in step 572, the chart position and the film position calculated in the above step 570 are displayed in the corresponding positions in the focusing point adjusting screen 150, and are stored in a predetermined area of the RAM 68.

Subsequently, in step 574, it is determined whether processing of steps 550 to 572 has been completed for all of the film carriers prepared in advance. In the case where processing is not complete, the process returns to step 550, the processing of step 550 to 572 is carried out for all of the film carriers for which processing has not been completed. Thereafter, the present focusing point adjusting processing is completed.

Due to this kind of focus point adjusting processing, the obtained film position (corresponding to a fourth value in the present invention) accurately corresponds to a distance in the optical axis direction between the photographic film and the chart. When setting fine scan reading conditions (step 518) in the fine scan processing (see FIG. 22) during the image reading processing (see FIG. 13), after carrying out sliding movement of the loading stand 47, the film position is offset. As a result, in step 474 of the autofocusing processing (see FIG. 17), the loading stand 47 is not moved by distance equal to the offset OF, and a member (the guide 142) is not provided to restrict the fluttering range when the photographic film is conveyed. The loading stand 47 can be set with high accuracy at the focusing point corresponding to the optical magnification of the fine scan to be carried out for the film image.

As explained above in detail, in the image reading apparatus according to the present second embodiment, the difference in position along the optical axis direction between the photographic film and the chart (corresponding to the fourth value in the present invention) is previously obtained, and the difference is reflected in the focusing point during fine scan. As a result, the focusing point can be set with greater accuracy than in the case where the difference is not applied.

Further, each of the above embodiments was explained for a case with a single optical magnification (in the embodiments, the optical magnification W=0.6 only) in carrying out focusing control of the chart during the focus calibration processing. However, the present invention is not limited to such cases. A structure may be adopted wherein focusing control is carried out for the chart, with respect to a plurality of optical magnifications, i.e., two or more.

Further, each of the above embodiments was explained for a case where the difference between the focusing point of the reference chart and of the chart is stored when carrying out the focus calibration processing. However, the present invention is not limited to such cases, and may be structured so as to store directly the focusing point of the chart without storing the difference, and then calculate the difference between the focusing point of the reference chart and of the chart according to need.

Each of the above embodiments was explained for a case in which adjustment data (the focusing point of the chart and the like) relating to focusing control for each of the types of the film carrier is held and used. However, the present invention is not limited to such cases. A structure may be adopted wherein the following are included: recording means such as a ROM, a barcode or the like having recorded therein information that can specify the film carriers by device in the film carrier, such as a serial number of the film carrier; inputting means which inputs the information at the image reading apparatus; and holding means which holds in advance the adjustment data characteristic of each of the film carriers for each of the film carriers to be used. This image reading apparatus inputs the information with the inputting means, specifies the film carrier, and uses the adjustment data held at the holding means by switching the data for each of the specified film carriers.

In this case, a plurality of film carriers of the same type can be used in a single image reading apparatus. Further, when the film carrier is switched due to failure or maintenance or the like while on the market, although generally adjustment particular to the film carrier is necessary, in cases such as that described above where the adjustment data is regulated for each of the film carriers, omissions in the preparation of the adjustment data can be checked.

Figure 18:
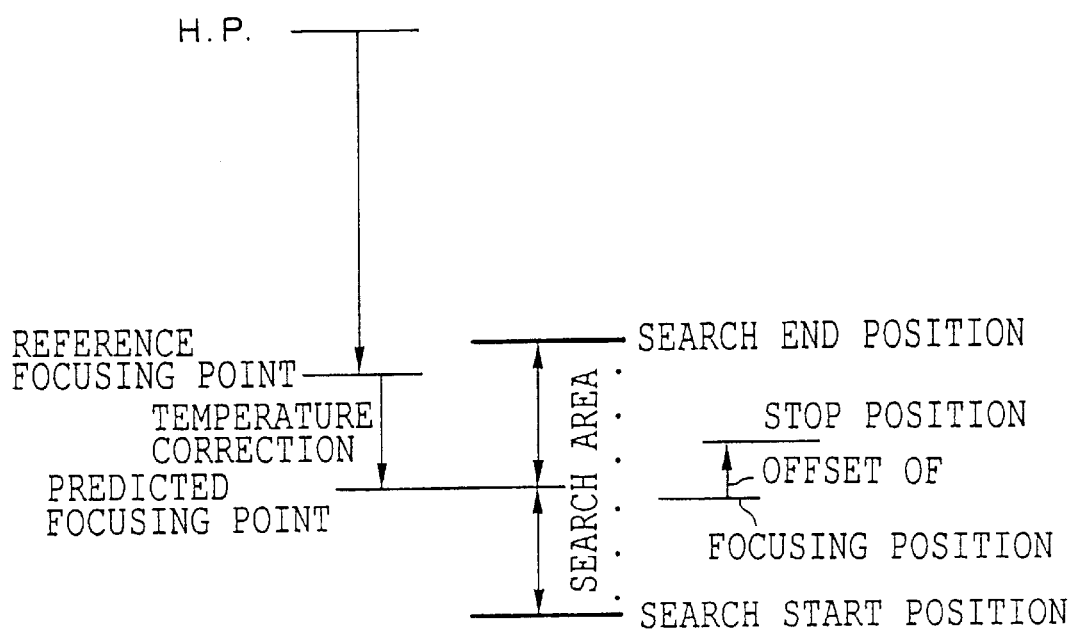
FIG. 18 is a model diagram showing a reference focusing point, a predicted focusing point, a search area, a focusing point and a final position where the loading stand stops with respect to the origin H.P.

Further, each of the above embodiments was explained for a case in which correction of the variations of the focusing point, which are due to the temperature difference between the time when the focusing point is obtained of the reference chart for each of the optical magnifications and the time when processing is carried out using the focusing point, is carried out with respect to the reference focusing point (see FIG. 18). However, the present invention is not limited to such cases. For example, a structure may be adopted wherein all of the focusing points of the reference chart for each of the optical magnifications (see FIG. 1) recorded in the ROM 70 just before fine scan is begun are read out, and temperature correction is carried out for each of the focusing points read out.

Further, each of the above-described embodiments was explained for a case in which the lens unit 50 as the image-forming means is moved in its entirety in the optical axis direction. However, the present invention is not limited to such cases. A structure may be adopted wherein a portion of a plurality of lenses provided at a zoom lens is moved in the optical axis direction, in a case where what is known as a zoom lens provided with the plurality of lenses, is applied as the image-forming means.

Also, each of the above embodiments was explained for the case in which a focusing point for the reference chart 135 arranged in the reference chart jig 132 is determined and stored for each of various optical magnifications at the time of focus calibration processing for the reference chart. The present invention is not limited to such a case, but can be structured to determine and store a focusing point for each optical magnification for the chart arranged in one of the film carriers for long film (hereinafter called the reference film carrier) using such a film carrier without using the reference chart jig 132. In such a case, the film carrier prepared for storing the difference in the focus calibration table is not the reference film carrier which is used for determining the difference.

Further, each of the above-described embodiments was explained taking up the case in which the image reading processing is executed by reading the photographic film of size 135. The present invention is not limited to such a case, but can be structured to read the photographic film of size 240 or the slide. In such a case, operation of the apparatus for reading the photographic film of size 240 is substantially the same as that of the present embodiment. The operation for reading the slide, however, is different with respect to the following points.

There is only one image to be read.

The film carrier for the slide does not have a chart for focusing control. The focusing control, therefore, is carried out based on the image contrast value substantially at the central portion of the slide image to be read.

Since the focusing is controlled using the slid image to be read, the loading stand 47 is not required to be moved by the distance equal to the offset OF, unlike in FIG. 18.

The operation of reading the slide is summarized in FIG. 24 taking the points described above into consideration. FIG. 24, like FIGS. 23A and 23B, is a schematic diagram showing the movement of the reading position relative to the photographic film by arrows from "start" to "end".

Figure 26:
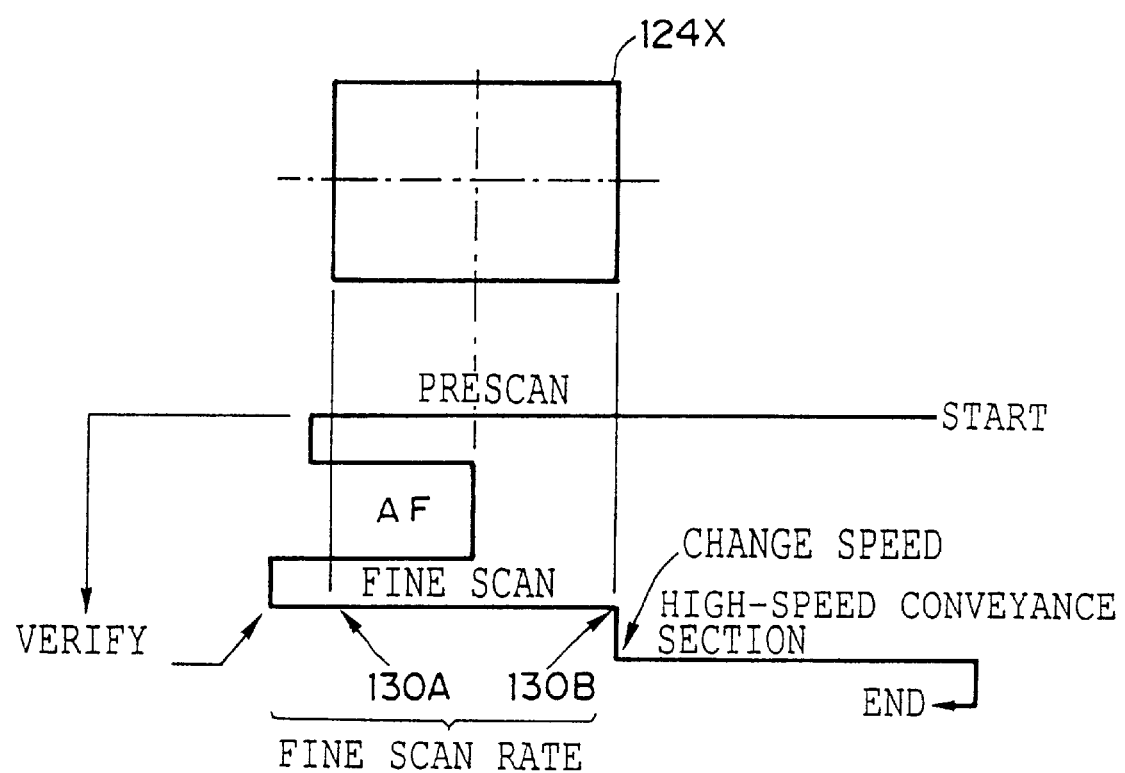
FIG. 26 is a schematic diagram showing the relative positions of the photographic film and the line CCD at the time of the image reading processing using a film carrier for sliding.

Namely, as shown in FIG. 26, the film image 124X of the slide conveyed at a predetermined prescan speed (5×v in the present embodiment) is prescanned, and then the image thereof is verified. At the same time, the slide is moved to perform the autofocusing processing (expressed as AF in FIG. 26) in such a manner that the center along the direction in which the film image 124X is conveyed substantially coincides with the optical axis L.

Thereafter, the slide is conveyed in the same direction of conveyance for prescan, and after being moved to a position where each portion can be set in accordance with the type of the film image 124X and the optical magnification, the direction in which the slide is conveyed is reversed again and the conveyance speed is switched to a value suitable for the type of the film image 124X (expressed as the fine scan speed in FIG. 26). At the same time, each portion is set in accordance with the type of the film image 124X and the optical magnification, and after that, the film image 124X is read for the section from the reading start position 130A to the reading end position 130B. Then, the slide is conveyed at high speed (5×v in the present embodiment) for the high-speed conveyance section 126B and delivered from the film carrier.

Also, in each of the above-described embodiments, an explanation was made of a case in which a position associated with the largest image contrast among a plurality of positions in the search area is determined as a focusing point in the focusing point search processing of FIG. 11 and the autofocusing processing of FIG. 17. The present invention, however, is not limited to such a case, but is applicable to a structure in which a position at an intermediate area between two points having the largest image contrast values among a plurality of positions may be determined as a focusing point.

Further, each of the foregoing descriptions of the embodiments refers to the case in which the position corrected in temperature with respect to the reference focusing point is determined as a predicted focusing point. The present invention is not limited to such a case but is applicable to a structure in which the reference focusing point is used directly as a predicted focusing point without carrying out temperature correction. In such a case, however, a search area slightly larger than in the present embodiment is required to be set taking the variations of the focusing point with temperature into account. In the case where the other conditions are similar to those of the present embodiment, the search time is longer than in the present embodiment.

Further, although each of the embodiments was described with reference to the case in which the temperature correction table shown in FIG. 19 is stored in advance, the present invention is not limited to such an arrangement, and the number of temperature correction pulses may be determined by calculation. Equation (1) is an example formula for such a calculation.

$$CP = 4 \times (T_o - T)/MO \quad (1)$$

where CP is the number of temperature correction pulses, $T_o$ the temperature at the time of focus calibration, T the temperature at the time of autofocusing, and MO the optical magnification.

Each of the above embodiments was described in reference to the case in which the focusing is effected by the image contrast method. The present invention, however, is not limited to such a case, but may comprise a distance sensor for measuring the distance between the photographic film and the lens unit 50 (or the line CCD 116) by infrared ray or the like, and the distance detected by the distance sensor may be used in place of the film image data.

Further, according to each of the above-described embodiments, a focusing point associated with an optical magnification of 0.6 is detected at the time of focusing of each film carrier in the focus calibration processing. However, the present invention is not confined to such a case, and the optical magnification used may be 0.8 or 1.0.

Also, each of the above embodiments was described in reference to the case in which the charts 140A, 140B arranged on the glass member 140 and the reference chart 135 arranged in the reference chart jig 132 are plotted with a plurality of straight lines along the direction in which the photographic film is conveyed. However, the present invention is not limited to such a case, and is applicable to any chart in which the image contrast value changes in accordance with the position of the loading stand 47.

Further, each of the above embodiments was explained with reference to the case in which the operator designates an image to be processed by use of a keyboard, the present invention is not limited to such a case and can be structured such that the frame number on the photographic film 22 corresponding to each simulation image displayed on the display 18 is displayed in the vicinity of the particular simulation image in advance, and the frame number of the image to be processed can be input by use of ten-keys (not shown) on the keyboard.

Also, instead of the configurations shown in FIGS. 16A to 16D for highlighting the image to be processed in the present embodiment as explained in each of the above embodiments, the present invention is applicable to the case in which only one of the simulation image corresponding to an image to be processed or the simulation image corresponding to an image not to be processed is displayed by blinking or the simulation image corresponding to an image not to be processed is displayed in reverse video.

Further, each of the explanations of the above embodiments refers to the case in which the light incident on the line CCD 116 is blocked by the CCD shutter 52 in order to prevent the discoloration of the color separation filters arranged in the line CCD 116. The present invention, however, is not limited to such a case. The light can be shielded by use of a diaphragm 39, for example.

Also, each of the explanations of the above embodiments refers to the case in which the photographic film 22 is a negative film. The present invention is not limited to such a case, however, and is of course applicable to the case in which a reversal film (positive film) is read.

Further, in each of the above embodiments, an explanation was made of the case in which the line CCD 116 is used as the image sensor according to the present invention. However, the present invention is not limited to such a case and can alternatively use an area CCD, or photoelectric conversion elements other than the CCD.

Figure 27:
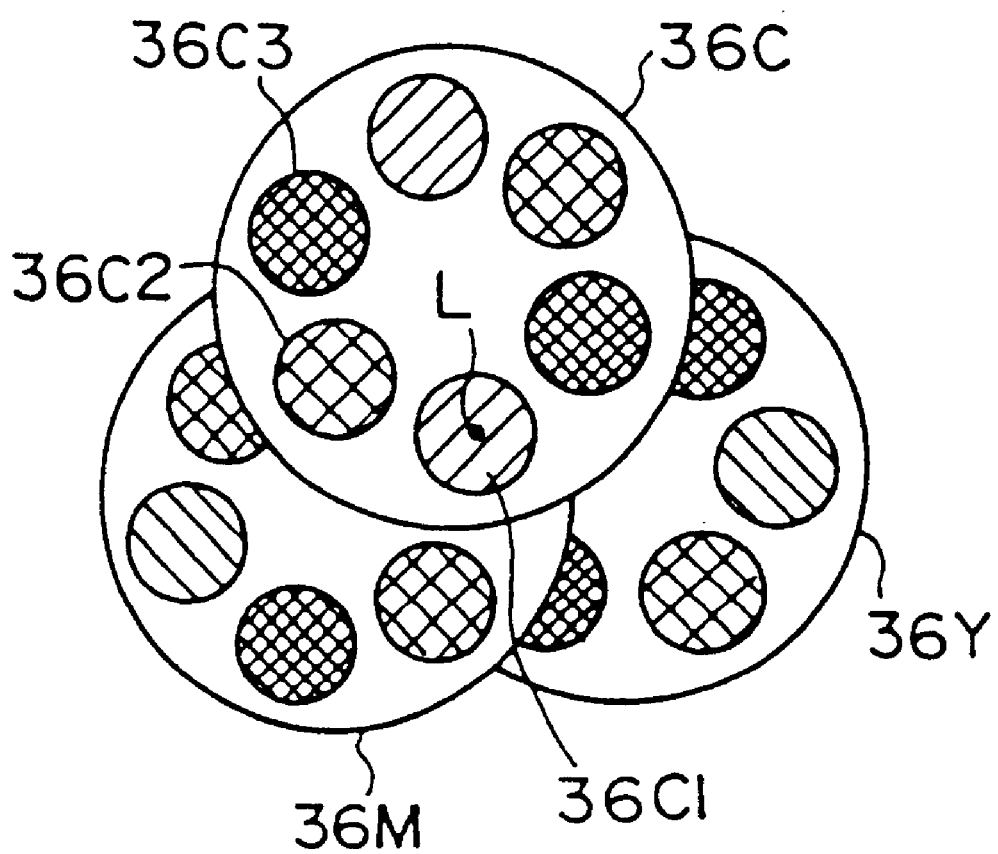
FIG. 27 is a plan view showing a modification of the turret.

Furthermore, the present invention is not limited to the turret (FIG. 4B) described above, but as shown in FIG. 27, can be configured of a turret 36C for a cyan filter for absorbing red light, a turret 36M for a magenta filter for absorbing green light, and a turret 36Y for a yellow filter for absorbing blue-purple light. The turret 36C has fitted therein a plurality of cyan filters 36C1, 36C2, 36C3 of different densities. The cyan filters 36C1, 36C2, 36C3 are successively higher in density in that order. The other turrets 36M, 36Y have also similar structures. The turrets 36C, 36M, 36Y are rotatably supported in such a manner that the selected filters of the turrets are disposed over each other on the optical axis L.

What is claimed is:

1. An image reading apparatus comprising:

a light source for illuminating the light on an original to be read having a plurality of images recorded thereon;

conveyance means for conveying said original to be read in such a manner that each of said plurality of images passes through a predetermined reading position sequentially;

image-forming means for focusing the light transmitted through said original to be read or the light reflected from said original to be read;

an image sensor for separating each of said plurality of images recorded on said original to be read into a plurality of pixels, reading said pixels and outputting said pixels as image data;

moving means for moving at least one of at least one portion of said image-forming means, said image sensor, and said original to be read along the optical axis direction of said image-forming means;

storage means for storing a first value of a focusing point for each of a plurality of optical magnifications and for storing at least one of at least one second value, which is obtained by controlling said moving means in such a manner as to control the focusing for at least one predetermined optical magnification of said plurality of said optical magnifications for an object located at said reading position, and a difference of said second value and said first value at the predetermined optical magnification with respect to said second value, said first value being obtained by controlling said moving means in such a manner as to control the focusing to attain a coincidence between the image-forming position of a reference object which image-forming position depends on said image-forming means and the position of said image sensor for each of said plurality of optical magnifications; and control means for controlling said moving means in such a manner that at least one of at least one portion of said image-forming means, said image sensor and said original to be read moves to a position based on said first value and on one of said difference and said second value, which are stored in said storage means, at the time of reading one of a portion and the whole of said plurality of images.

2. An image reading apparatus according to claim 1, wherein said control means controls said moving means in such a manner that the focusing is controlled for said object with reference to a position based on said first value and on one of said difference and said second value, which are stored in said storage means, before reading one of a portion and the whole of said plurality of images, a third value for the focusing point at the time when the focusing is controlled for said object is stored, and in the case where the optical magnification of the image next to be read is different from the present optical magnification, said moving means is controlled in such a manner that at least one of at least one portion of said image-forming means, said image sensor, and said original to be read is moved to a position based on said first value and said third value.

3. An image reading apparatus according to claim 2, wherein said object is provided in the vicinity of a conveyance passage surface of the original to be read in said conveyance means, said apparatus further comprises a limiting member disposed on or in the vicinity of said conveyance means, for limiting the range of displacement of said original to be read along the optical axis direction to twice the depth of field of said image-forming means or less, and said apparatus offsets the distance equal to one half of said range of displacement with respect to a position determined according to said first value and said third value.

4. An image reading apparatus according to claim 2, wherein said storage means further stores as a fourth value a difference in position with respect to the optical axis direction between said original to be read and said object; and said controlling means, in a case where the optical magnification of the image next to be read is different from the present optical magnification, controls said moving means so as to move at least one of at least one portion of said image-forming means, said image sensor, and said original to be read, to a position based on said first value, said third value, and said fourth value.

5. An image reading apparatus according to claim 2, further comprising a plurality of said conveyance means corresponding to the types of said original to be read;

wherein said storage means stores at least one of said difference and said second value for each of a plurality of said conveyance means, and said control means stores said third value for the conveyance means used.

6. An original reading apparatus according to claim 2, further comprising detection means for detecting the temperature of said image-forming means, wherein said control means controls said moving means in such a manner that the position based on said first value and said difference is corrected according to the temperature detected by said detection means before reading one of a portion and the whole of said plurality of images, and controls said moving means such that focusing control for the object is carried out with reference to said corrected position, storing a third value for the focusing point simultaneously.

7. An image reading apparatus according to claim 1, wherein when processing using said first value is carried out, said first value is used after being corrected in accordance with a difference between the present temperature and a temperature when said first value is obtained.

8. An image reading apparatus according to claim 1, further comprising a plurality of said conveyance means corresponding to the types of said original to be read;

wherein said storage means stores at least one of said difference and said second value for each of a plurality of said conveyance means.

9. An image reading apparatus according to claim 1, wherein said object is used as said reference object.

10. An original conveyance apparatus mounted in an image reading apparatus, for conveying an image recorded on an original to be read to a predetermined reading position, comprising:

an object that can be read by said image reading apparatus and is a reference for focusing control of said image located at a position other than a conveyance passage for said original to be read;

wherein said object is formed with light transmitted through a chart; and wherein said chart plots a plurality of straight lines along a direction in which said original is conveyed.

11. An original conveyance apparatus according to claim 10, further comprising one each of said object on both sides of said conveyance passage for said original to be read.

12. An original conveyance apparatus according to claim 10, wherein said one each of said objects on both sides of said conveyance passage is located an equal distance from an optical axis of said reading apparatus.

13. The apparatus of claim 10, wherein the image reading apparatus reads the original along the conveyance passage.

14. An image reading method for an image reading apparatus, said image reading apparatus comprising:

a light source for illuminating light on an original to be read having a plurality of images recorded thereon;

conveyance means for conveying said original to be read in such a manner that each of said plurality of images passes through a predetermined reading position sequentially;

image-forming means for focusing the light transmitted through said original to be read or the light reflected from said original to be read;

an image sensor for separating each of said plurality of images recorded on said original to be read into a plurality of pixels, reading and outputting said pixels as image data; and moving means for moving at least one of at least one portion of said image-forming means, said image sensor and said original to be read along the optical axis direction of said image-forming means; and said method comprising the steps of:

storing a first value of a focusing point for each of a plurality of optical magnifications and for storing at least one of at least one second value, which is obtained by controlling said moving means in such a manner as to control the focusing for at least one predetermined optical magnification of said plurality of said optical magnifications for an object located at said reading position, and a difference of said second value and said first value at the predetermined optical magnification with respect to said second value, said first value being obtained by controlling said moving means in such a manner as to control the focusing to attain a coincidence between the image-forming position of a reference object which image-forming position depends on said image-forming means and the position of said image sensor for each of said plurality of optical magnifications; and controlling said moving means in such a manner that at least one of at least one portion of said image-forming means, said image sensor, and said original to be read moves to a position based on said first value and on one of said difference and said second value which are stored in said storage means at the time of reading one of a portion and the whole of said plurality of images.

15. An original reading method according to claim 14, further comprising the steps of:

controlling said moving means in such a manner as to control the focusing of said object with reference to a position based on said first value and on one of said difference and said second value before reading one of the portion and the whole of said plurality of images, and storing a third value for said focusing point at the time when the focusing is controlled for said object; and controlling said moving means in such a manner as to move at least one of at least one portion of said image-forming means, said image sensor, and said original to be read to a position based on said first value and said third value in the case where the optical magnification of the image next to be read is different from the present optical magnification.

16. An original reading method according to claim 15, wherein as for said image reading apparatus, said object is provided in the vicinity of a conveyance passage surface of said original to be read in said conveyance means, and a limiting member is further comprised in one of said conveyance means and a vicinity of said conveyance means, for limiting the range of displacement of said original to be read along the optical axis direction to twice the depth of field of said image-forming means or less; and said method further comprises the step of offsetting the distance equal to one half of said range of displacement with respect to a position determined in accordance with said first value and said third value when reading a portion or the whole of said plurality of images.

17. An image reading method according to claim 15, wherein the difference in position with respect to said optical axis direction between said original to be read and said object is recorded as a fourth value, and in the case where the optical magnification of the image next to be read is different from the present optical magnification, said moving means is controlled so as to move at least one of at least one portion of said image-forming means, said image sensor, and said original to be read to a position based on said first value, said third value, and said fourth value.

18. An image reading method according to claim 15, wherein said image reading apparatus further comprises a plurality of said conveyance means corresponding to the types of said original to be read; and at least one of said difference and said second value for each of a plurality of said conveyance means is stored, and said third value for the conveyance means used is stored.

19. An original reading method according to claim 15, wherein said image reading apparatus further comprises detection means for detecting the temperature of said image-forming means, and wherein said moving means is controlled in such a manner that the position based on said first value and said difference is corrected according to the temperature detected by said detection means before reading one of a portion and the whole of said plurality of images, and such that focusing control for the object is carried out with reference to said corrected position, storing a third value for the focusing point simultaneously.

20. An image reading method according to claim 14, wherein when processing using said first value is carried out, said first value is used after being corrected in accordance with a difference between the present temperature and a temperature when said first value is obtained.

21. An image reading method according to claim 14, wherein said image reading apparatus further comprises a plurality of said conveyance means corresponding to the types of said original to be read; and at least one of said difference and said second value for each of a plurality of said conveyance means is stored.

22. An image reading method according to claim 14, wherein said object is used as said reference object.

23. An image reading apparatus comprising:

a light source for illuminating the light on an original to be read having a plurality of images recorded thereon;

conveyance means for conveying said original to be read in such a manner that each of said plurality of images passes through a predetermined reading position sequentially;

image-forming means for focusing the light transmitted through said original to be read or the light reflected from said original to be read;

an image sensor for separating each of said plurality of images recorded on said original to be read into a plurality of pixels, reading said pixels and outputting said pixels as image data;

moving means for moving at least one of at least one portion of said image-forming means, said image sensor, and said original to be read along the optical axis direction of said image-forming means;

storage means for storing a first value of a focusing point for each of a plurality of optical magnifications, said first value being obtained by controlling said moving means in such a manner as to control the focusing to attain a coincidence between the image-forming position of a reference object which image-forming position depends on said image-forming means and the position of said image sensor for each of said plurality of optical magnifications; and control means for controlling said moving means in such a manner that at least one of at least one portion of said image-forming means, said image sensor and said original to be read moves to a position based on said first value, which is stored in said storage means at the time of reading one of a portion and the whole of said plurality of images.

24. An image reading method for an image reading apparatus, said image reading apparatus comprising:

a light source for illuminating light on an original to be read having a plurality of images recorded thereon;

conveyance means for conveying said original to be read in such a manner that each of said plurality of images passes through a predetermined reading position sequentially;

image-forming means for focusing the light transmitted through said original to be read or the light reflected from said original to be read;

an image sensor for separating each of said plurality of images recorded on said original to be read into a plurality of pixels, reading and outputting said pixels as image data; and moving means for moving at least one of at least one portion of said image-forming means, said image sensor and said original to be read along the optical axis direction of said image-forming means; and said method comprising the steps of:

storing a first value of a focusing point for each of a plurality of optical magnifications, said first value being obtained by controlling said moving means in such a manner as to control the focusing to attain a coincidence between the image-forming position of a reference object which image-forming position depends on said image-forming means and the position of said image sensor for each of said plurality of optical magnifications; and controlling said moving means in such a manner that at least one of at least one portion of said image-forming means, said image sensor, and said original to be read moves to a position based on said first value, which is stored in said storage means at the time of reading one of a portion and the whole of said plurality of images.

* * * * *